(12) United States Patent
Narahara et al.

(10) Patent No.: US 7,587,673 B2
(45) Date of Patent: Sep. 8, 2009

(54) INFORMATION PROCESSING APPARATUS, METHOD AND PROGRAM

(75) Inventors: Tatsuya Narahara, Kanagawa (JP); Nobuyuki Fujiwara, Kanagawa (JP); Toshiharu Yabe, Tokyo (JP); Kenichiro Kobayashi, Kanagawa (JP); Tsutomu Seki, Chiba (JP); Hideaki Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 11/488,097

(22) Filed: Jul. 18, 2006

(65) Prior Publication Data

US 2007/0033006 A1    Feb. 8, 2007

(30) Foreign Application Priority Data

Jul. 19, 2005    (JP)    ............................. 2005-208840

(51) Int. Cl.
  G06F 3/00    (2006.01)
  G06F 17/00    (2006.01)
(52) U.S. Cl. ...................... 715/716; 715/210; 715/722; 715/723
(58) Field of Classification Search ................. 715/234, 715/764, 210, 716, 722–723, 746, 756; 707/3, 707/10; 725/9, 14, 35, 46
See application file for complete search history.

(56) References Cited

U.S. PATENT DOCUMENTS

| | | | |
|---|---|---|---|
| 6,177,931 B1 | 1/2001 | Alexander et al. | |
| 6,195,655 B1 | 2/2001 | Lawler | |
| 6,732,102 B1 * | 5/2004 | Khandekar | ................... 715/764 |
| 2005/0138658 A1 * | 6/2005 | Bryan | ........................ 725/46 |
| 2005/0149987 A1 | 7/2005 | Boccon-Gibod et al. | |

FOREIGN PATENT DOCUMENTS

| | | |
|---|---|---|
| JP | 8-166961 | 6/1996 |
| JP | 10-042236 | 2/1998 |
| JP | 10-336601 | 12/1998 |
| JP | 2001-101195 | 4/2001 |
| JP | 2005-115790 | 4/2005 |
| JP | 2005-158044 | 6/2005 |
| WO | WO 2005/015902 | 2/2005 |

* cited by examiner

Primary Examiner—Weilun Lo
Assistant Examiner—Truc T Chuong
(74) Attorney, Agent, or Firm—Oblon, Spivak, McClelland, Maier & Neustadt, P.C.

(57) ABSTRACT

An information processing apparatus which allows a user to select information on a predetermined program as programs interesting to the user and current topics of conversation. The information processing apparatus includes: a first selection section for extracting a keyword from program information of a predetermined program selected from at least one of a program being received and a recorded program, and selecting article information including the same keyword as the extracted keyword among article information described in an RSS format and being delivered to a user; and a display controller for displaying the article information selected by the first selection section simultaneously with an image of the predetermined program.

8 Claims, 28 Drawing Sheets

FIG. 2

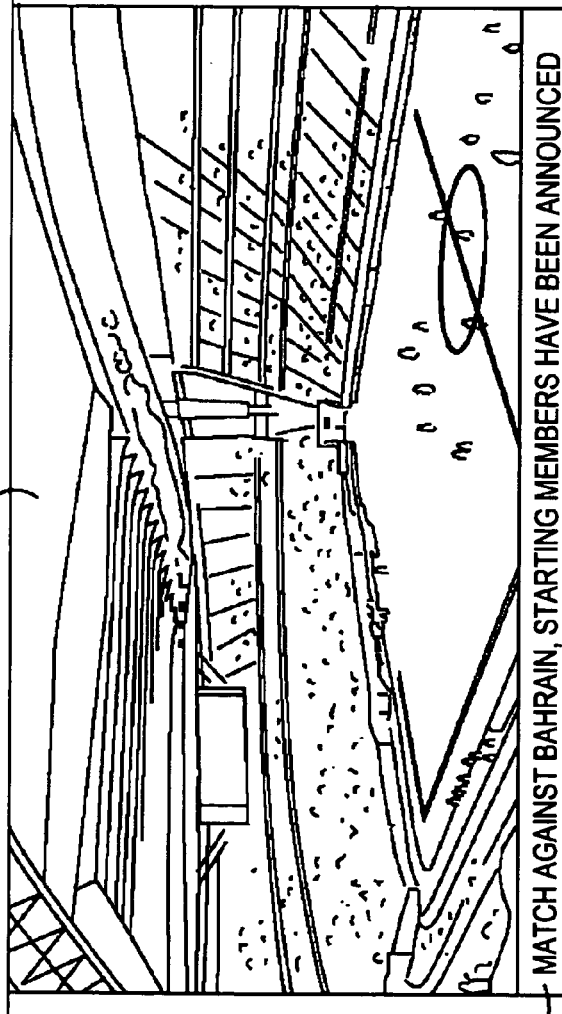

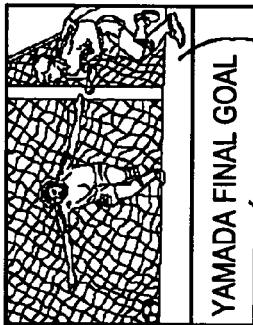
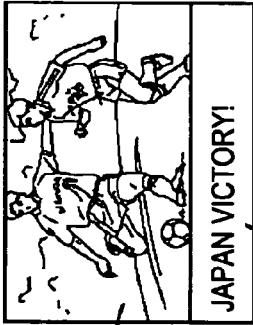

THE TOURNAMENT IS JUST AROUND THE CORNER, AND THUS FEATURED IN NEWSPAPERS AND ON TV. IN RECENT NIKKAN SPORTS, THERE IS AN ARTICLE ON THE RESULT OF NIKKAN SPORTS' OWN QUESTIONNAIRES. IT IS INTERESTING, AND THUS IS FEATURED HERE. FIRST, THE STARTING MEMBERS FOR ASIA PRELIMINARY SELECTED BY THE READERS ARE FORWARDS, OHARA, OOMIZU, HALFBACKS ARE

MATCH AGAINST BAHRAIN, STARTING MEMBERS HAVE BEEN ANNOUNCED

JAPAN VICTORY!

YAMADA FINAL GOAL

SPECIAL FEATURE ON ASIA PRELIMINARY

"FATHER" IS SELECTED
(WHEN SOCCER IS A CURRENT TOPIC)

"FATHER" IS SELECTED
(WHEN SUMO AND HORSE RACING ARE CURRENT TOPICS)

"MOTHER" IS SELECTED

FIG. 12

| HD/SD | PROGRAM TITLE | PROGRAM DETAILS |
|---|---|---|
| HD | [J!] GRAND SUMO SUMMER TOURNAMENT –FINAL DAY– | [COMMENT] FRONT (JUNIOR GRADE) TACHIYAMAKAWA, [ANNOUNCER] FRONT (JUNIOR GRADE) EIJI IWAKURA, ~RELAY FROM RYOUGOKU KOKUGIKANN~ |
| HD | [N!] [J!] GRAND SUMO SUMMER TOURNAMENT –FINAL DAY– | "INTERVIEW OF WRESTLER WHO WON THE TOURNAMENT". (3:35) "SENIOR GRADE MATCHES". [COMMENT] FRONT (SENIOR GRADE) MASAAKI MINAMINOFUJI, OPPOSED FRONT (SENIOR GRADE) HIDENORI MAINOYAMA, [ANNOUNCER] FRONT (SENIOR GRADE) FUJIO YAMAYA |
| HD | HORSE RACING | KEYAKI STAKES, KAMAKURA SPECIAL, ~TOKYO~ GOLDEN KILLER WHALE [G III], SHIRAYURI S, ~CHUKYO~ CROWN HORSE COMES INTO EXISTENCE? |
| HD | [DE] HORSE RACING FORECAST! | HEATED DISCUSSION BY RACING PROPHETS BASED ON ORIGIN, HORSE BODY, SPEED INDEX, RIDING GROUND BEAM, ETC. "DERBY" IN THIS WEEK |
| SD | 2006 W CUP, ASIA FINAL PRELIMINARY SPECIAL, –JAPAN REPRESENTATIVES LATEST INFORMATION– | [COMMENT] MICHAEL MIYAUCHI, MASAMI IMOTO, KAZUJI YAMAMURA [CASTER] AIKO ISHIKAWA, SHUNNJI NOGAWA, YU YAMADA, <INTERRUPTION> 10:00–10:15 BS NEWS |
| HD | 2006 W CUP, ASIA REGION FINAL PRELIMINARY SPECIAL, IRAN VS. NORTH KOREA [DE] | "NEVER GET DEFEATED" FATEFUL MATCH ONCE AGAIN!! COMMENT: YASUTARO MATSUMOTO AND OTHERS |
| HD | 2006 W CUP, ASIA REGION FINAL PRELIMINARY SPECIAL, BAHRAIN VS. JAPAN [DE] | "NEVER GET DEFEATED" JAPAN BREAKS THROUGH PRELIMINARY SOON, TESTED AWAY DECISIVE MATCH WILL BE COMPLETELY RELAYED!! COMMENT: KAWAGOE SERGIO, KOICHI NAKAZOE, AND OTHERS |
| HD | 2006 W CUP, ASIA REGION FINAL PRELIMINARY SPECIAL, JAPAN VS. BAHRAIN | [COMMENT] KAWAGOE SERGIO [PITCH COMMENT] KOICHI NAKAZOE [LIVE] YUJI TAGUCHI (TV ASAHI ANNOUNCER) [NAVIGATOR] JIMYOU KAWANO [CHEER LEADER] SHINNGO KATORI |
| ... | ... | ... |

FIG. 13

| 20050605 | 12 | soccer.sports.com |
|---|---|---|
| 20050605 | 12 | sports.sports.com |
| 20050605 | 12 | horseracing.sports.com |
| RANKING | TOPIC NUMBER OF WORDS | PROGRAM TITLE | PROGRAM DETAILS |
|---|---|---|---|
| 1 | 8 | 2006 W CUP, ASIA REGION FINAL PRELIMINARY SPECIAL, BAHRAIN VS. JAPAN [DE] | "NEVER GET DEFEATED" JAPAN BREAKS THROUGH PRELIMINARY SOON, TESTED AWAY DECISIVE MATCH WILL BE COMPLETELY RELAYED!! COMMENT: KAWAGOE SERGIO, KOICHI NAKAZOE, AND OTHERS |
| 2 | 6 | 2006 W CUP, ASIA FINAL PRELIMINARY SPECIAL, "IRAN" VS. "BAHRAIN" | (GAME START JAPAN TIME 11:35PM) [COMMENT] MICHAEL MIYAUCHI, [ANNOUNCER] TAKAKI TORIYAMA, ~RELAY FROM IRAN AZADI STADIUM~ |
| 3 | 6 | 2006 W CUP, ASIA REGION FINAL PRELIMINARY SPECIAL, IRAN VS. NORTH KOREA [DE] | "NEVER GET DEFEATED" ZICO FATEFUL MATCH ONCE AGAIN!! COMMENT: YASUTARO MATSUMOTO AND OTHERS |
| 4 | 6 | 2006 W CUP, ASIA REGION FINAL PRELIMINARY SPECIAL, NORTH KOREA VS. JAPAN [DE] | "MATCH THAT CAN NEVER GET DEFEATED" FINAL CHAPTER TO 2006 GERMANY W CUP COMMENT: YASUTARO MATSUMOTO, TAKUMI HOTTA AND OTHERS |
| 5 | 5 | 2006 W CUP, ASIA FINAL PRELIMINARY, "JAPAN" VS. "NORTH KOREA" | (GAME START JAPAN TIME 7:35PM) [COMMENT] MASAMI IMOTO, [ANNOUNCER] SHUNNJI NOGAWA, [REPORTER] JUN TANAKA ~RELAY FROM THAILAND SUPACHALASAI NATIONAL STADIUM~ |
| 6 | 5 | 2006 W CUP, ASIA REGION FINAL PRELIMINARY SPECIAL, IRAN VS. BAHRAIN [DE] | "MATCH THAT CAN NEVER GET DEFEATED" TOWARD 2006 GERMANY W CUP COMMENT: KOICHI NAKZOE AND OTHERS |
| 7 | 5 | 2006 W CUP, ASIA FINAL PRELIMINARY SPECIAL ~JAPAN REPRESENTATIVES LATEST INFORMATION~ | [COMMENT] MICHAEL MIYAUCHI, MASAMI IMOTO, KAZUJI YAMAMURO [CASTER] AIKO ISHIKAWA, SHUNNJI NOGAWA, YU YAMADA <INTERRUPTION> 10:00–10:15 BS NEWS |

FIG. 14

| HD/SD | PROGRAM TITLE | PROGRAM DETAILS |
|---|---|---|
| HD | FRIDAY DRAMA "TIGER & TIGER" THE EIGHTH STORY | THE LEGENDARY SPECIAL DRAMA COMES BACK AS A SERIES OF DRAMAS! |
| HD | MENTAL TRAINING G [JI] | FAMOUS ACTRESS ANNOUNCES PASSIONATE LOVE & BANKRUPT IN PARIS, EXTRAVAGANT LIFE !!! |
| HD | MUSIC ONLY FOR ME [S] | THE 59TH IS MASAJI FUKUDA AND SIMON. RIGHT TOWN FOR TWO: AT GOLDEN STREET IN SHINJUKU, TALK FROM EARLY MORNING |
| HD | BOY | "SEVEN WISE PERSONS", SABURO MICHIBA, KENNSUKE CHIN, YUKIO HATTORI, MASAYA TAMARU, ASAMI KISHI, REMI KAWANO, YOSHIHARU NAKAI, AND SHANESE JR. INTRODUCE A SECRET SHOP! |
| HD | [B] YOUNG MUSIC THE BOY CLUB | SHANY SEKI∞, KANSAI JUNIOR, SHANESE JR., [HOST] KET-TUN, ~RECORDED AT NNK OSAKA HALL~ |
| HD | [KAI] [JI] YOSHITSUNE (22) "FATEFUL JOURNEY UP TO CAPITAL" | [ORIGINAL] TOMIKO MIYATA, [SCRIPT] NARUHITO KANE [PRESENTATION] HIDEO TAKIZAWA, KENN YAMADAIRA, KIYOTAKA KITAHARA, KIYOSHI UJIKI, ATSUSHI SATO, ATSUSHI SAKAUCHI, KENN SANNTO, TOMOKO MORIGUCHI, SHINNGO TSURUTA, HIROSHI AGAWA, YUIKA NATSUKAWA, AND OTHERS |
| HD | NEW NAKAMOTO BROTHERS [JI] [S] | NEW SENSE MUSIC TALK VARIETY "NAKAMOTO BROTHERES" HAS BEEN POWERED UP! ATTENTION TO SUPER LIVE |
| HD | CHANNEL α, DRASTIC EXPANSION! [JI] [S] | UNEXPECTEDLY MOVED BY A SERIES OF PAST DRAMAS THAT NEED TO BE VIEWED ONCE AGAIN, ···LINE UP THAT ATTRACTS TV FANS |
| ... | ... | ... |

FIG. 15

| | | |
|---|---|---|
| 20050605 | 12 | show.sports.com |
| 20050605 | 12 | showtopics. - .gaanews |
| 20050605 | 12 | SHANESE LATEST INFORMATION |
| 20050605 | 12 | societytopics. - .gaanews |
| 20050605 | 12 | asahi.com |
| 20050605 | 12 | MOVIE LIFE NEWS |

| RANKING | TOPIC NUMBER OF WORDS | PROGRAM TITLE | PROGRAM DETAILS |
|---|---|---|---|
| 1 | 4 | SNAP×SNAP [JI] [S] | GORGEOUS GUSETS VISITS TODAY. BISTRO CHEF EXCERTS HIS SKILL. LIMITED SPECIAL LIVE IS DELIVERED. |
| 2 | 4 | <THURSDAY THEATER> OCHITARA ~SECRET~ #09 [JI] [S] | SUCCESS STORY AT IT COMPANY LOCATED AT ROPPONGI HILLS. FIGURE WHO IS PLAYING ACTIVE ROLE IS DEPICTED WITH A COMEDY TOUCH INCLUDING LOVE AND FRIENDSHIP. |
| 3 | 2 | FRIDAY DRAMA "TIGER & TIGER" THE EIGHTH STORY | THE LEGENDARY SPECIAL DRAMA COMES BACK AS A SERIES OF DRAMAS! |
| 4 | 2 | HORSE RACING | KEYAKI STAKES, KAMAKURA SPECIAL, ~TOKYO~ GOLDEN KILLER WHALE [G [III]], SHIRAYURI S, ~CHUKYO~ DOUBLE CROWN HORSE COMES INTO EXISTENCE? |
| 5 | 2 | CHANNEL α, DRASTIC EXPANSION! [JI] [S] | UNEXPECTEDLY MOVED BY A SERIES OF PAST DRAMAS THAT NEED TO BE VIEWED ONCE AGAIN, ... LINE UP THAT ATTRACTS TV FANS |
| 6 | 2 | 2006 W CUP, ASIA REGION FINAL PRELIMINARY SPECIAL, BAHRAIN VS. JAPAN [DE] | "THERE IS A MATCH NEVER GET DEFEATED ... AFC" RUSH INTO FATEFUL FINAL CHAPTER SOON! ZICO JAPAN BREAKS THROUGH PRELIMINARY, TESTED AWAY DECISIVE MATCH WILL BE COMPLETELY RELAYED!! COMMENT: KAWAGOE SERGIO, KOICHI NAKAZOE, AND OTHERS |
| 7 | 2 | 2006 W CUP, ASIA REGION FINAL PRELIMINARY SPECIAL, JAPAN VS. BAHRAIN | [COMMENT] KAWAGOE SERGIO [PITCH COMMENT] KOICHI NAKAZOE [LIVE] YUJI TAGUCHI (TV ASAHI ANNOUNCER) [NAVIGATOR] JIMYOU KAWANO [CHEER LEADER] SHINNGO KATORI |

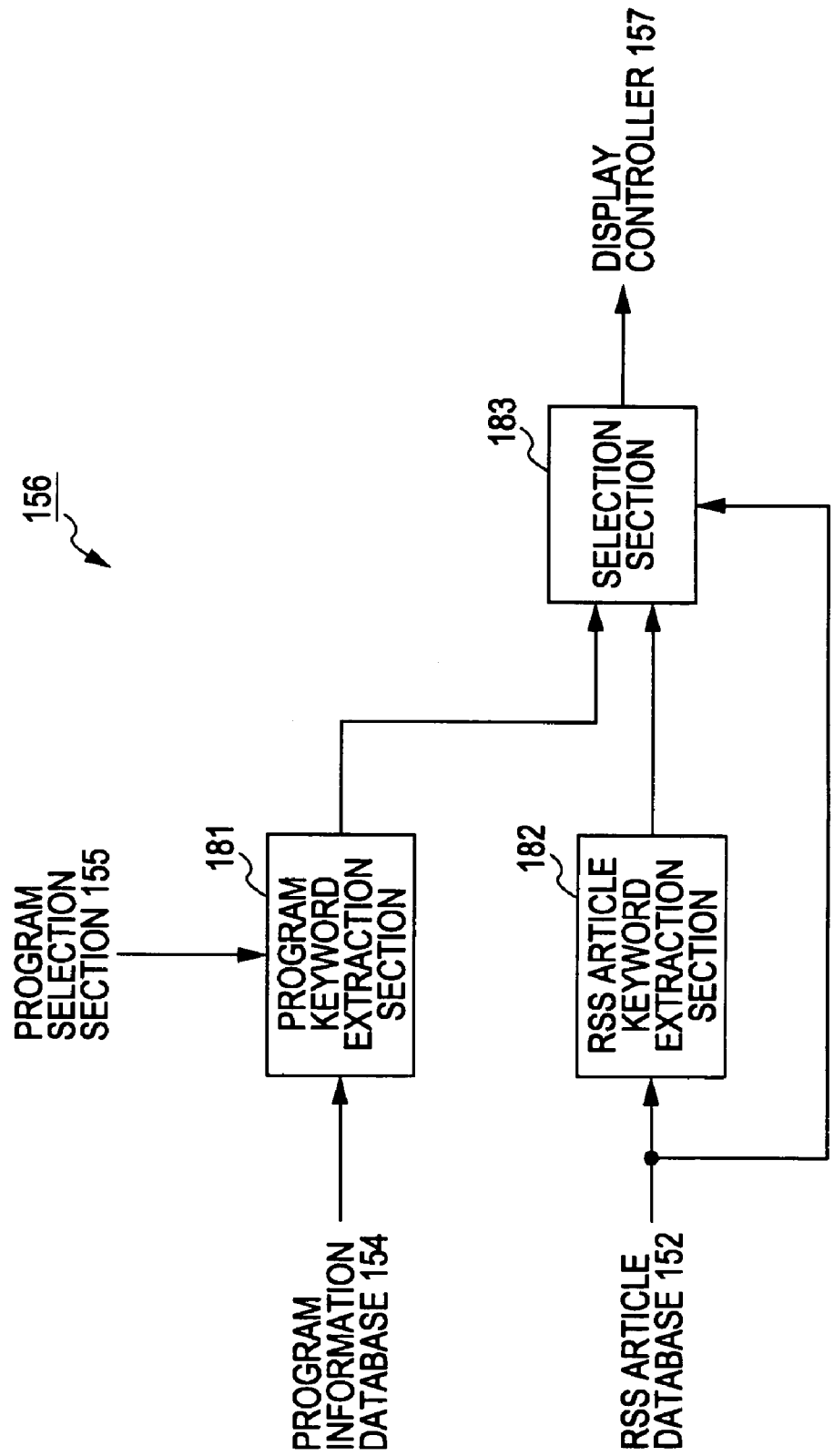

FIG. 28
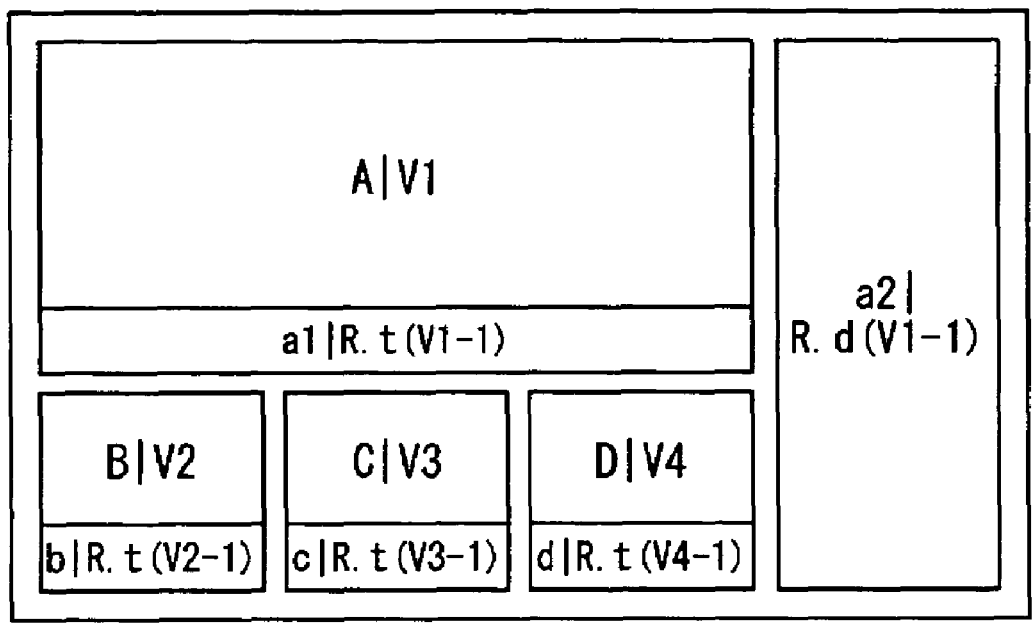
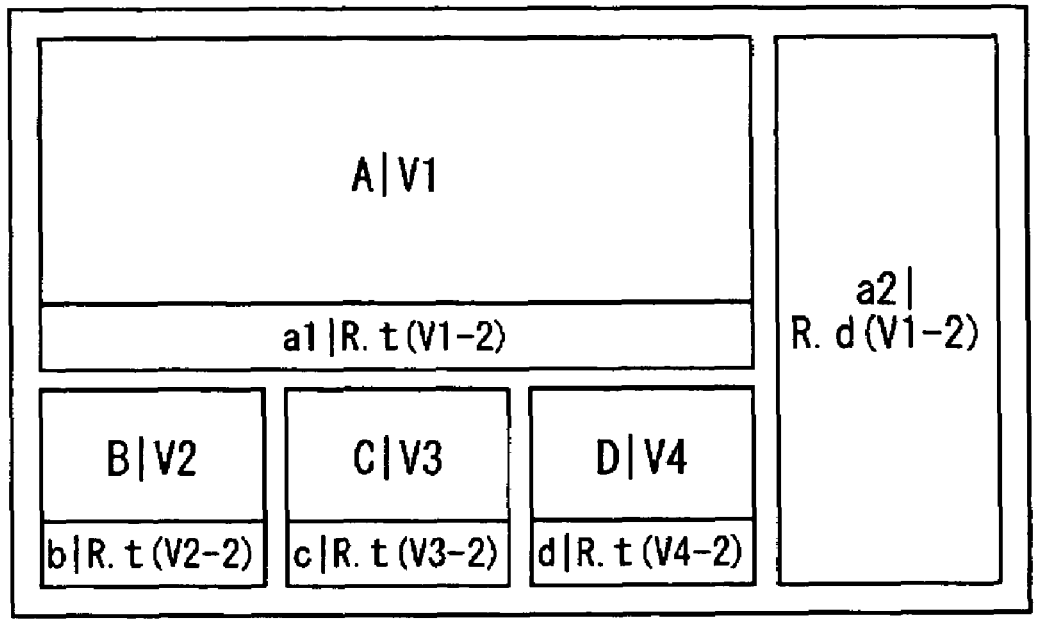

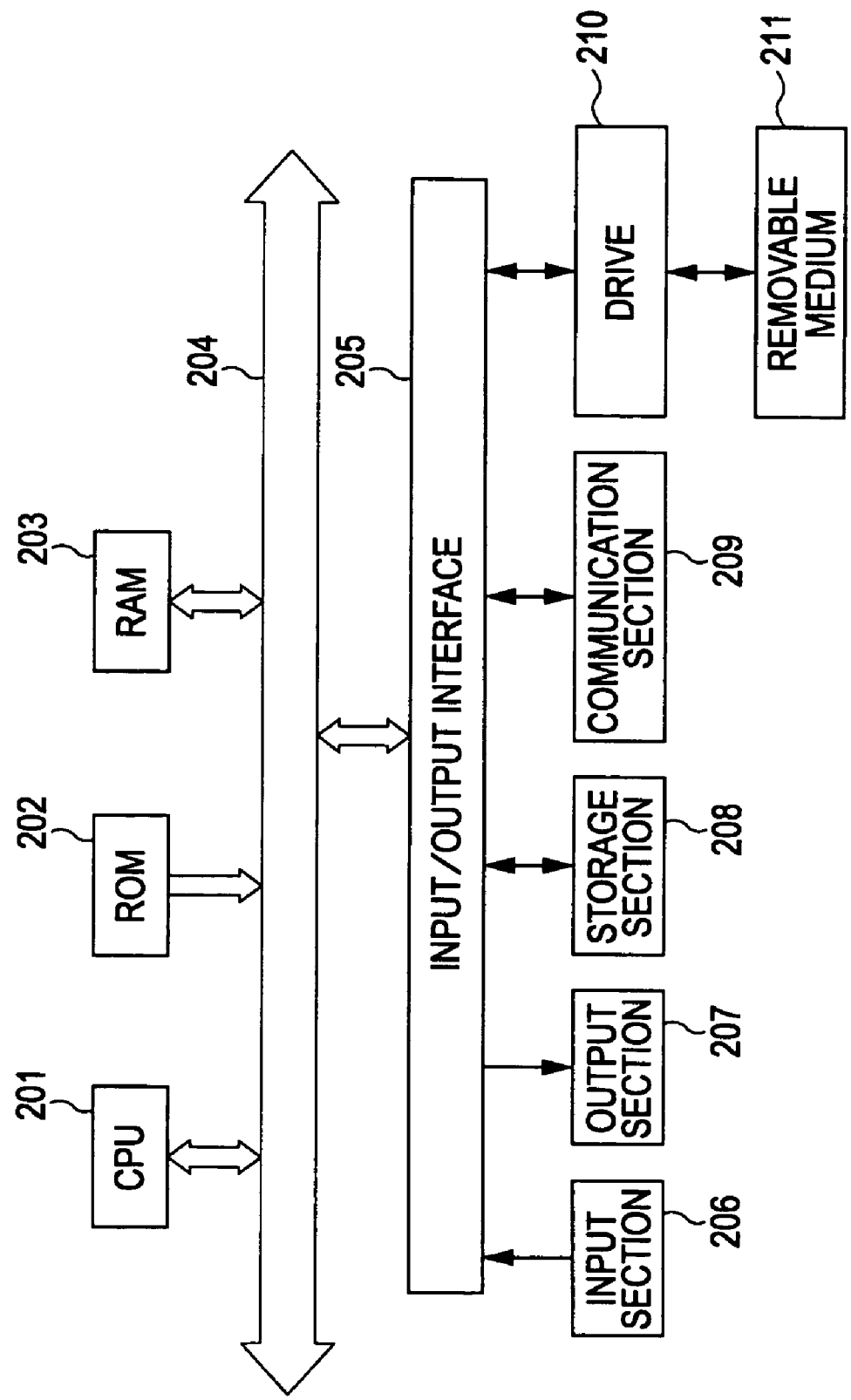

INFORMATION PROCESSING APPARATUS, METHOD AND PROGRAM

CROSS REFERENCES TO RELATED APPLICATIONS

The present invention contains subject matter related to Japanese Patent Application JP 2005-208840 filed in the Japanese Patent Office on Jul. 19, 2005, the entire contents of which are incorporated herein by reference.

BACKGROUND OF THE INVENTION

1. Field of the Invention

The present invention relates to an information processing apparatus, method, and program. More, particularly, the present invention relates to an information processing apparatus, method, and program capable of selecting information related to predetermined programs, such as programs which are interesting to a user and are current topics of conversation.

2. Description of the Related Art

To date, there have been techniques which analyze matters considered to be current topics on the basis of the number of keywords, etc., included in program information provided as an EPG (Electronic Program Guide), and introduce to users the recorded programs and the programs to be broadcast that match the current topics.

Thus, a user can be provided with, for example the introductions of soccer programs among the recorded programs and the programs to be broadcast during the tournament in which soccer programs are frequently broadcast.

Japanese Unexamined Patent Application Publication No. 8-166961 has disclosed a technique for enabling a user to easily get information on a particular subject by extracting keywords from a plurality of character string data and by selecting information on the basis of the extracted keywords.

However, there is a problem in that subject matters determined only by program information are not necessarily popular topics among general users, because the contents addressed in the program are not selected by the reflection on subjective judgment of an individual, for example "I am interested in certain topics, or certain topics are popular around me".

In recent years, bulletin boards on which users write their opinions, Weblogs (so-called Blogs) which attract people's attention as a tool for dispatching personal information, etc., have become widespread. Although some topics are not addressed in programs, those topics are often very popular among a certain bulletin board or Blog.

If the programs are selected in accordance with the matters taken up on a bulletin board or a Weblog, or the matters taken up in news delivered at a portal site, and those programs can be presented to a user, it becomes possible to introduce programs that are not dependent on program organizations. Also, if the headlines of news, etc., are displayed along with the programs to be introduced at that time, the user can select whether to view the introduced program while seeing those headlines.

SUMMARY OF THE INVENTION

The present invention has been made in view of these circumstances. For example, it is desirable to enable users to select information related to predetermined programs, such as programs which are interesting to the users and are current topics of conversation.

According to an embodiment of the present invention, there is provided an information processing apparatus including: a first selection section for extracting a keyword from program information of a predetermined program selected from at least one of a program being received and a recorded program, and selecting article information including the same keyword as the extracted keyword among the article information described in an RSS format and being delivered to a user; and a display controller for displaying the article information selected by the first selection section simultaneously with an image of the predetermined program.

The first selection section may give a ranking to the extracted keyword and select one of article information having a highest ranking, and the display controller may display one piece of the article information having the highest ranking selected by the first selection section simultaneously with the image of the predetermined program.

The display controller may further switch displays of the article information in accordance with the given rankings.

The information processing apparatus may further include: a first setting section for extracting a keyword from article information described in an RSS format and being delivered to a user, and giving a ranking to the extracted keyword; a second setting section for acquiring at least one of program information on a program being received and program information on a recorded program, and giving a ranking to the program including, in the program information, the same keyword as a keyword having as far as a predetermined ranking among the keywords having rankings given by the first setting section; and a second selection section for selecting the predetermined program on the basis of the rankings given by the second setting section.

According to an embodiment of the present invention, there is provided a method or a program of information processing including the steps of: extracting a keyword from program information of a predetermined program selected from at least one of a program being received and a recorded program, and selecting article information including the same keyword as the extracted keyword among the article information described in an RSS format and being delivered to a user; and displaying the selected article information simultaneously with an image of the predetermined program.

According to an embodiment of the present invention, keywords are extracted from program information of a predetermined program selected from at least one of a program being received and a recorded program, and article information including the same keyword as the extracted keyword is selected among the article information described in an RSS format and being delivered to a user. Also, the selected article information is displayed simultaneously with an image of the predetermined program.

According to an embodiment of the present invention, it is possible for a user to select information related to predetermined programs, such as programs which are interesting to the user and are current topics of conversation.

BRIEF DESCRIPTION OF THE DRAWINGS

FIG. 2 is a diagram illustrating an example of a programs/RSS article introduction screen;

FIG. 12 is a diagram illustrating an example of program information;

FIG. 13 is a diagram illustrating an example of program rankings;

FIG. 14 is a diagram illustrating another example of program information;

FIG. 15 is a diagram illustrating another example of program rankings;

FIG. 16 is a block diagram illustrating an example of the detailed configuration of an RSS article selection section in FIG. 9;

FIG. 28 is a diagram illustrating an example of switching displays;

FIG. 31 is a block diagram illustrating an example of the configuration of a personal computer.

DESCRIPTION OF THE PREFERRED EMBODIMENTS

In the following, a description will be given of an embodiment of the present invention. The relationship between the constituent features of the present invention and the embodiment described in the detailed description of the present invention is exemplified as follows. This description is for confirming that an embodiment supporting the present invention is included in the detailed description of the present invention. Accordingly, if there is an embodiment included in the detailed description of the present invention, but not included here as an embodiment corresponding to the constituent features, the fact does not mean that the embodiment does not corresponds to the constituent features. On the contrary, if an embodiment is included here as constituent features corresponding to the present invention, the fact does not mean the embodiment does not correspond to the features other than the constituent features.

An information processing apparatus (for example, the information processing apparatus 1 in FIG. 1) according to an embodiment of the present invention includes: a first selection section (for example, a selection section 183 in FIG. 16) for extracting a keyword from program information of a predetermined program (for example, a display candidate program) selected from at least one of a program being received and a recorded program, and selecting article information including the same keyword as the extracted keyword among the article information described in an RSS format and being delivered to a user; and a display controller (for example, a display controller 157 in FIG. 9) for displaying the article information selected by the first selection section simultaneously with an image of the predetermined program.

Figure 10:
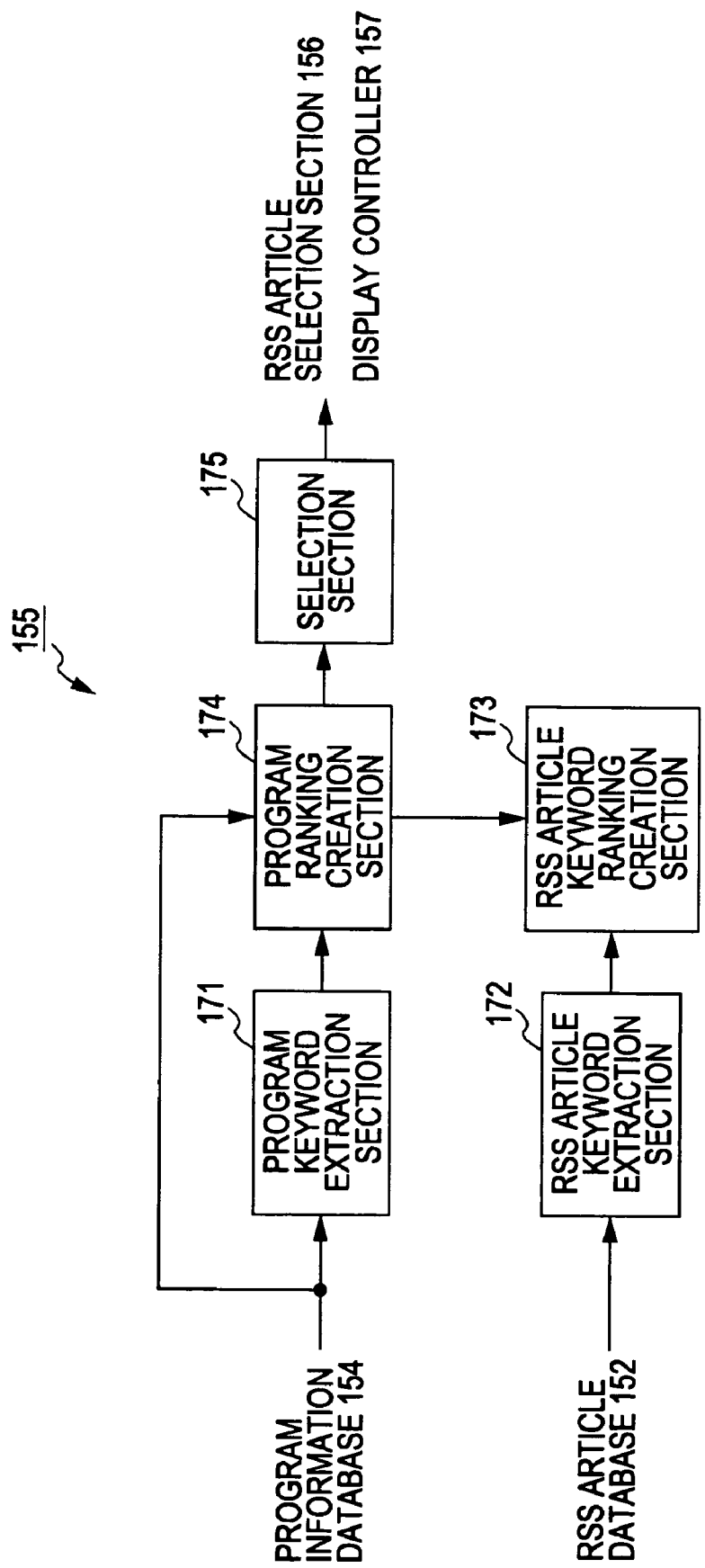
FIG. 10 is a block diagram illustrating an example of the detailed configuration of a program selection section in FIG. 9.

The information processing apparatus may further include: a first setting section (for example, an RSS article keyword ranking creation section 173 in FIG. 10) for extracting a keyword from article information described in an RSS format and being delivered to a user, and giving a ranking to the extracted keyword; a second setting section (for example, a program ranking creation section 174 in FIG. 10) for acquiring at least one of program information on a program being received and program information on a recorded program, and giving a ranking to the program including, in the program information, the same keyword as a keyword having as far as a predetermined ranking among the keywords having rankings given by the first setting section; and a second selection section (for example, a selection section 175 in FIG. 10) for selecting the predetermined program on the basis of the rankings given by the second setting section.

A method or a program of information processing according to an embodiment of the present invention include the steps of: extracting a keyword from program information of a predetermined program (for example, display candidate program) selected from at least one of a program being received and a recorded program, and selecting (for example, step S68 in FIG. 24) article information including the same keyword as the extracted keyword among the article information described in an RSS format and being delivered to a user; and displaying (for example, step S71 in FIG. 25) the selected article information simultaneously with an image of the predetermined program.

In the following, a description will be given of an embodiment of the present invention with reference to the drawings.

Figure 1:
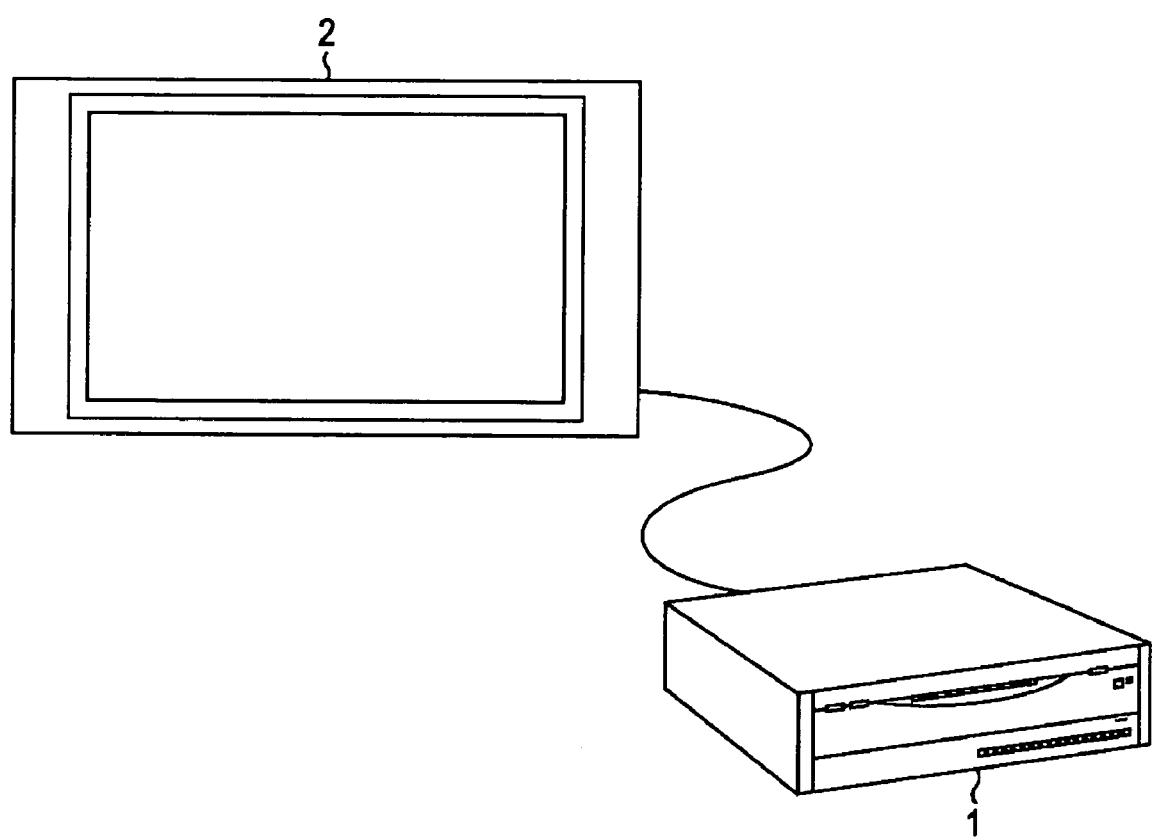
FIG. 1 is a diagram illustrating an example of an information processing apparatus according to an embodiment of the present invention and a television receiver connected thereto.

FIG. 1 is a diagram illustrating an example of an information processing apparatus according to an embodiment of the present invention and a television receiver (TV) connected thereto.

The information processing apparatus 1 is a digital picture recording apparatus having an HDD (Hard Disk Drive) built-in. The information processing apparatus 1 not only outputs images and sound of a program from a TV 2, but appropriately acquires program data from the broadcast wave received by an antenna not shown, and stores the acquired program data into the HDD (records the program).

The information processing apparatus 1 has a function of acquiring a broadcast EPG, a function of acquiring an EPG by connecting to a predetermined server via the Internet and downloading from the server. The EPG includes program information, such as a title, a category, a broadcast date and time, performers, a program summary, etc.

Also, the information processing apparatus 1 is connected to a network, and has a function of receiving information in an RSS (Resource Description Framework Site Summary) format, which is delivered from newspaper publisher's sites, various portal sites, etc., registered in advance by a user and acquiring articles, such as news, comments, etc. That is to say, the information processing apparatus 1 is equipped with an RSS reader which reads information in the RSS format.

Here, RSS is a data format used for describing the titles, hyperlinks, and the summary of the sentences (texts), etc., written on Web pages and Weblogs, and indicating the summary of the Web pages and the Weblogs. The apparatuses to be provided with information receive article information in the RSS format (in the following, called RSS articles appropriately) delivered from the sites that the user has registered in advance. Thus, the user can acquire the Web page information including sentences, images, etc., and when the contents of the Web pages are updated, the user can acquire the updated Web page information immediately after the update.

In the information processing apparatus 1 having such a function, matters of current topics in general are determined from the acquired RSS articles. Then the programs addressing the topics are selected from the recorded programs or the programs being broadcast, and are introduced to the user.

For example, keywords are extracted from the RSS articles that have been delivered from the sites registered by the user. Rankings are set to the keywords in accordance with the number of the keywords included in the RSS articles. Also, rankings are given to the programs whose program information (title and summary) including high ranking keywords in accordance with the number of the included keywords, and the high ranking programs are selected as the programs to be introduced to the user.

Also, from the programs selected to be introduced to the user, the RSS articles are selected as the related information, and are introduced to the user.

The selected programs and the RSS articles, namely the related information to the programs, are displayed on the TV 2. The user is allowed to instruct to view the program from the screen, or to instruct the display of the Web page, etc., (that content) whose summary is displayed by the RSS article body text or the RSS article.

FIG. 2 is a diagram illustrating a program/RSS article introduction screen displayed by the information processing apparatus 1.

The program/RSS article introduction screen includes a main screen 11, an RSS article title display section 11A, an RSS article body text display section 11B, sub-screens 12-1 to 12-3, and RSS article title display sections 12-1A to 12-3A.

In the example of FIG. 2, the widest area is allocated to the main screen 11, and the RSS article title display section 1A is provided below the main screen 11. Sub-screens 12-1 to 12-3 having the same-size areas individually are displayed below the RSS article title display section 11A. RSS article title display sections 12-1A to 12-3A are provided below the sub-screens 12-1 to 12-3, respectively. 11A RSS article body text display section 11B is provided in the right side of the screen.

The main screen 11 is an area in which the program having the highest ranking (still image or moving image of the program) selected from the recorded program or the program being broadcast is basically displayed. For example, a program whose program information includes the largest number of keywords that are extracted from the RSS articles and listed on relatively high rankings is regarded as the program having the highest ranking, and thus that program is displayed on the main screen 11. In the example in FIG. 2, an image of a soccer rely is displayed in the main screen 11.

For the image of the program to be displayed on the main screen 11, for example if the program is a recorded program, the image selected from the data of the recorded program is used. If the program is a program being broadcast, the image of the program being broadcast or the image provided by being included in the program information is used. This is the same for the images to be displayed on the sub-screens 12-1 to 12-3.

In the example of FIG. 2, in the RSS article title display section 11A provided below the main screen 11 on which a program of a soccer relay is displayed, the RSS article title related to the soccer relay, "match against Bahrain, the starting members are announced" is displayed. This title is, for example the RSS article title being delivered from a predetermined site at the time of starting the broadcast of the soccer relay displayed on the main screen 11.

The RSS article body text display section 11B is an area in which the body text of the RSS article whose title is displayed in the RSS article title display section 11A. In the example of FIG. 2, an article on the starting members of the soccer match displayed on the main screen 11 is displayed.

The contents to be broadcast as a program is considered to include some information which is taken up on a Web page or a weblog. Thus, if the RSS article on such a program can be acquired, it becomes possible to display the title and the body text along with the program.

The sub-screens 12-1 to 12-3 are areas in which programs having lower rankings than the program displayed in the main screen 11 are displayed, and images of soccer programs are displayed, individually. The RSS article title display sections 12-1A to 12-3A provided below the sub-screens 12-1 to 12-3 are areas in which the titles of the RSS articles selected as the related information of the program displayed on the sub-screens 12-1 to 12-3 are displayed. In the example of FIG. 2, the titles of the RSS articles on soccer are displayed in the RSS article title display sections 12-1A to 12-3A, respectively.

That is to say, this example shows the case in which the user receives the delivery of the RSS articles on soccer, and some soccer programs have been already recorded or being broadcast.

By selecting the programs displayed on the main screen 11, and the sub-screens 12-1 to 12-3 from the program/RSS article introduction screen of FIG. 2, the user is allowed to view the recorded soccer programs. Also, by selecting the titles of the RSS articles, the user is allowed to see the body text and that content of the RSS articles.

Also, the user is allowed to switch the programs that are displayed on the main screen 11, and the sub-screens 12-1 to 12-3 by a predetermined operation. When the programs are switched, the displays of the RSS articles (the title and the body text of the RSS articles) to be introduced are also switched with the program switch.

The contents of the RSS articles delivered to the user are interesting to the user, and thus the information processing apparatus 1 can select interesting programs to the user by selecting the programs on the basis of the RSS articles as described above.

Also, when the information published on a delivery site of the RSS articles is updated, the RSS articles are acquired immediately after the update, and the programs are selected on the basis of the acquired RSS articles. Thus, the information processing apparatus 1 can select the programs suitable for the current topics among general users.

A description will be given below of the details of the processing of the information processing apparatus 1 for displaying such a program/RSS article introduction screen.

Here, a description will be given of the other screens displayed by the information processing apparatus 1.

Figure 3:
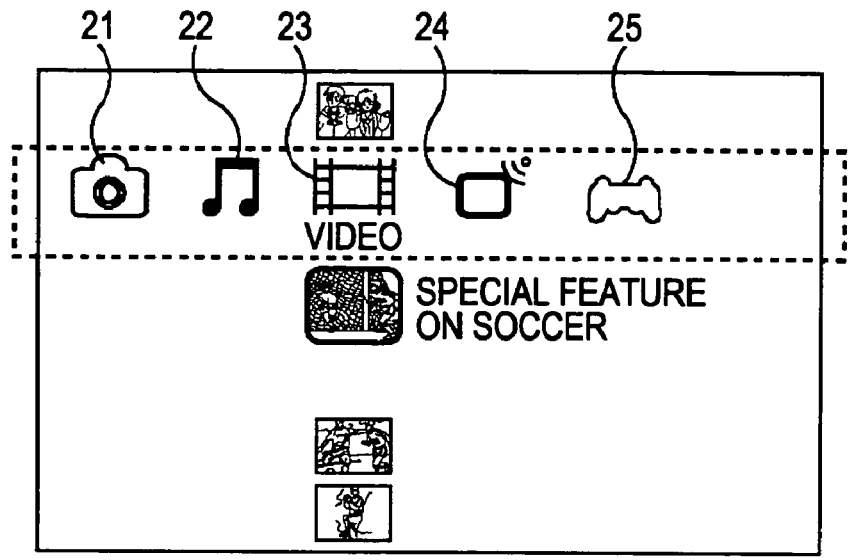
FIG. 3 is a diagram illustrating an example of a menu screen.
Figure 4:
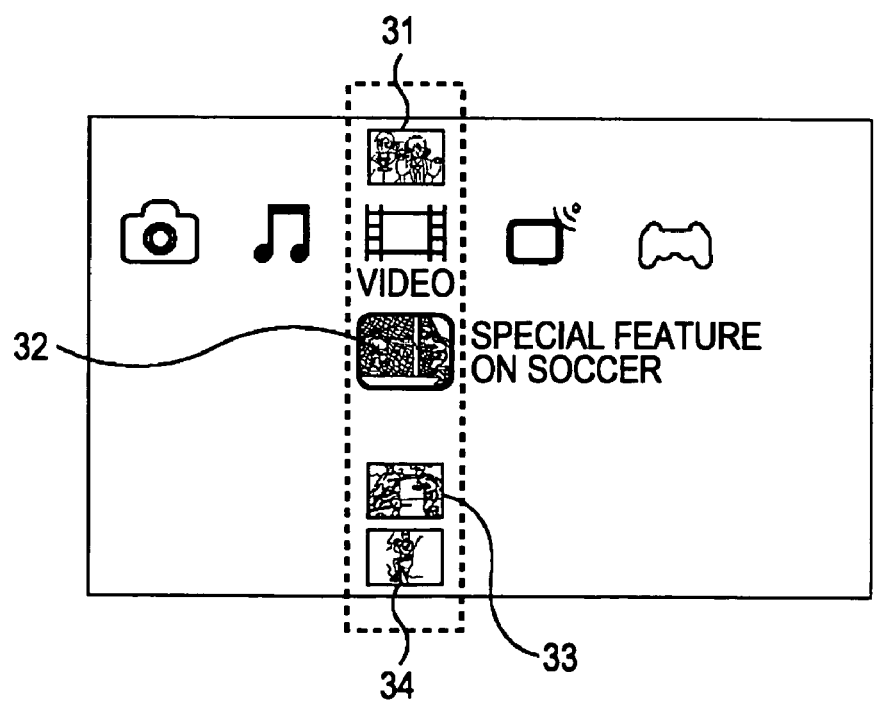
FIG. 4 is a diagram illustrating another example of a menu screen.

FIGS. 3 and 4 are diagrams illustrating examples of a menu screen displayed by the information processing apparatus 1.

As shown by a broken line in FIG. 3, category icons 21 to 25 indicating individual categories are arranged to be displayed in a lateral direction of the screen. Also, as shown by a broken line in FIG. 4, content icons (video content icons 31 to 34), which indicate the contents included in the category selected by the user, are arranged to be displayed in a vertical direction perpendicular to the arrangement direction of the category icons 21 to 25. In this regard, the broken lines in FIGS. 3 and 4 are given for the sake of explanation, and are not actually shown on the menu screen.

In the examples of FIGS. 3 and 4, a category icon 21 indicating a "photo" category, a category icon 22 indicating a "music" category, a category icon 23 indicating a "video" category, a category icon 24 indicating a "television" category, and a category icon 25 indicating a "game" category are arranged to be displayed from the left to the right of the screen.

That is to say, the information processing apparatus 1 has a "video" function which is selected when an operation on recording a program, such as reproduction of a recorded program, etc., is performed, a "television" function which is selected when a program being broadcast is viewed, a "photo" function which is selected when an image (still image) captured from a digital camera, etc., is reproduced, a "music" function which is selected when music stored in the internal HDD is reproduced, and a "game" function which is selected when a game is performed.

Also, in the example of FIGS. 3 and 4, the user has selected "video", and the content icons 31 to 34 indicating video icons included in "video" are arranged to be displayed in the vertical direction.

The icon currently selected out of the content icons 31 to 34 is the content icon 32. The content icon 32 is an icon to be selected when the start of the reproduction of the recorded program, "soccer special" is instructed. The character "soccer special" is displayed next to the content icon 32.

On such a menu screen, the user can basically select a category by the lateral operation (right and left buttons) of a remote controller, and can select a content included in the selected category by the vertical operation (up and down buttons).

In accordance with the user's operation, the category icons 21 to 25 (the category icons 21 to 25, and the other category icons indicating the other categories not shown in FIGS. 3 and 4) and the content icons 31 to 34 (the content icons 31 to 34, and the other content icons not shown in FIGS. 3 and 4) are all moved together, individually.

For example, in the state of FIG. 3 in which "video" is selected, if the user presses the left button one time, the category icons 21 to 25 are entirely moved together in the right direction. The category icon 22 will be moved to the position where the category icon 23 is displayed now, and the category icon 21 will be displayed at the position where the category icon 22 is displayed.

In the same manner, the category icon 23 will be displayed at the position where the category icon 24 is displayed now, and the category icon 24 will be displayed at the position where the category icon 25 is displayed. Another category icon, which is not shown in FIGS. 3 and 4 but disposed at the left side of the category icon 21, will be displayed at the position where the category icon 21 is displayed.

Thus, the current state is changed to a state of selecting "music" in place of "video", and the content icons indicating audio contents included in "music" are arranged and displayed in the vertical direction.

On the other hand, if the user presses the right button one time in the state of FIG. 3, the category icons 21 to 25 are all moved together in the left direction on the contrary. Thus, the current state is changed to a state of selecting "television".

Also, for example, in the state of FIG. 3 in which the content icons 31 to 34 are displayed, if the user presses the up button one time, the content icons 31 to 34 are all moved together in the upward direction. The content icon 32 will be moved to the position where the content icon 31 is displayed now, and the content icon 33 will be displayed at the position where the content icon 32 is displayed.

In the same manner, the content icon 34 will be displayed at the position where the content icon 33 is displayed now, and another content icon, which is not shown in FIGS. 3 and 4 but disposed just under the content icon 34, will be displayed at the position where the content icon 34 is displayed.

Thus, the current state is changed to a state of selecting the content icon 33 from the state of selecting the content icon 32. At this time, the tile of the video content indicated by the content icon 33, etc., is displayed next to the content icon 33.

On the other hand, if the user presses the downward button one time in the state of FIG. 3, the content icons 31 to 34 are all moved together in the downward direction on the contrary. Thus, the current state is changed to a state of selecting the content icon 31.

The user is allowed to display the program/RSS article introduction screen shown in FIG. 2 from such a menu screen.

For example, when a category for selecting a user (profile) is selected, if the information processing apparatus 1 is used by a plurality of users, such as a family members, etc., icons (characters) for selecting a user using the information processing apparatus 1, for example "father", "mother", "elder brother", and "younger sister", etc., are arranged in the vertical direction. If the user is a father, the father can receive an introduction of the programs and RSS articles suitable for him by selecting the "father" icon.

Figure 5A:
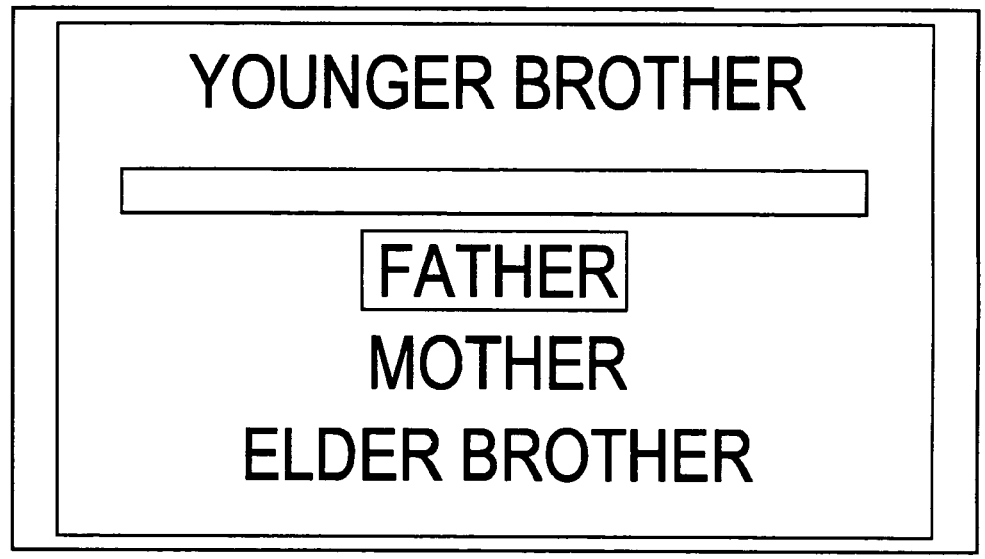
FIGS. 5A and 5B are diagrams illustrating an example of switching from a menu screen to a program/RSS article introduction screen.

FIG. 5A is a diagram illustrating an example of display when a category for selecting a user is selected on the menu screen.

Figure 5B:
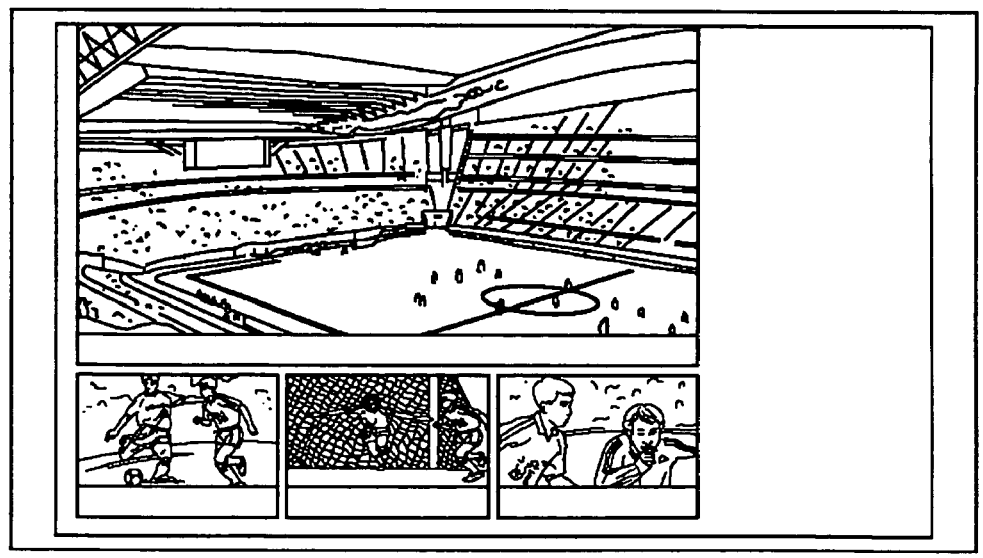

In the example of FIG. 5A, the icons of "younger brother", "father", "mother", and "elder brother" are arranged in the vertical direction and displayed. When the user selects the icon of "father", if the "father" receives the RSS article delivery on soccer, and soccer is currently a general topic, as shown in FIG. 5B, the TV 2 shows the program/RSS article introduction screen for introducing soccer programs and the related RSS articles to the programs.

Figure 6A:
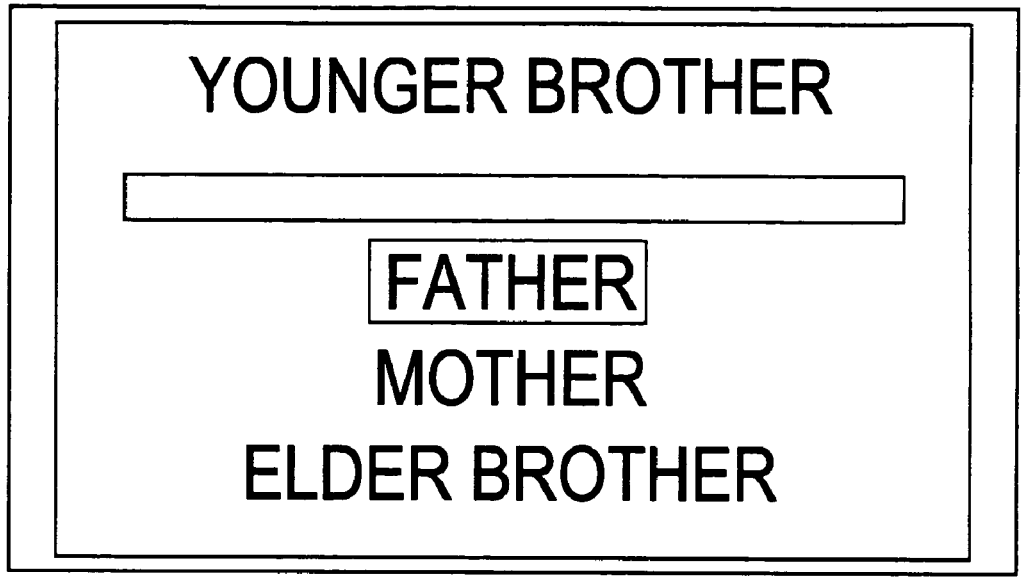
FIGS. 6A and 6B are diagrams illustrating another example of switching from a menu screen to a program/RSS article introduction screen.
Figure 6B:
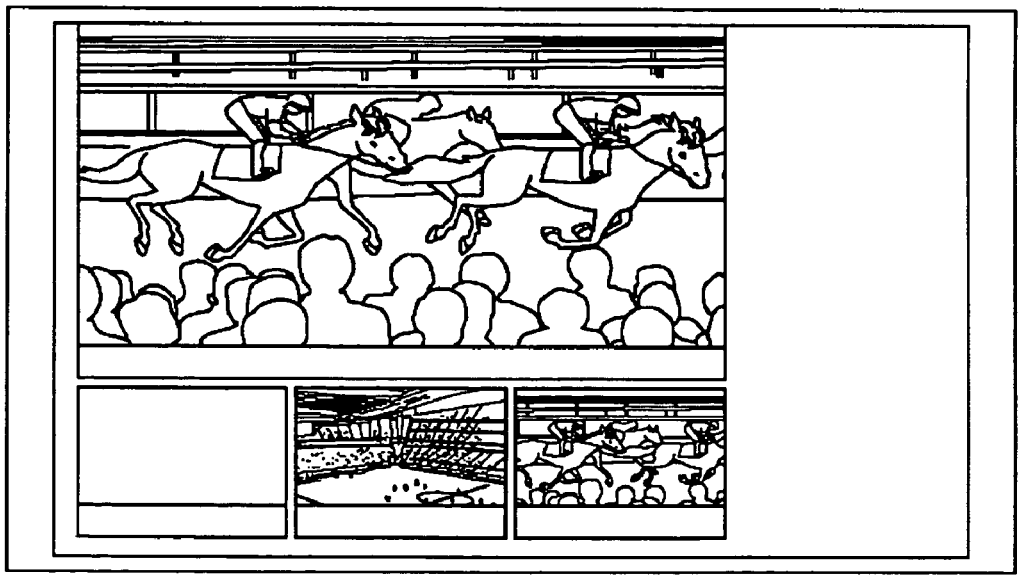

In the same manner, if the "father" receives the RSS article delivery on horse racing, and horse racing (Derby) is currently a general topic, when the user selects the icon of "father" as shown in FIG. 6A, the TV 2 shows the program/RSS article introduction screen for introducing horse racing programs and the related RSS articles to the programs as shown in FIG. 6B.

Figure 7A:
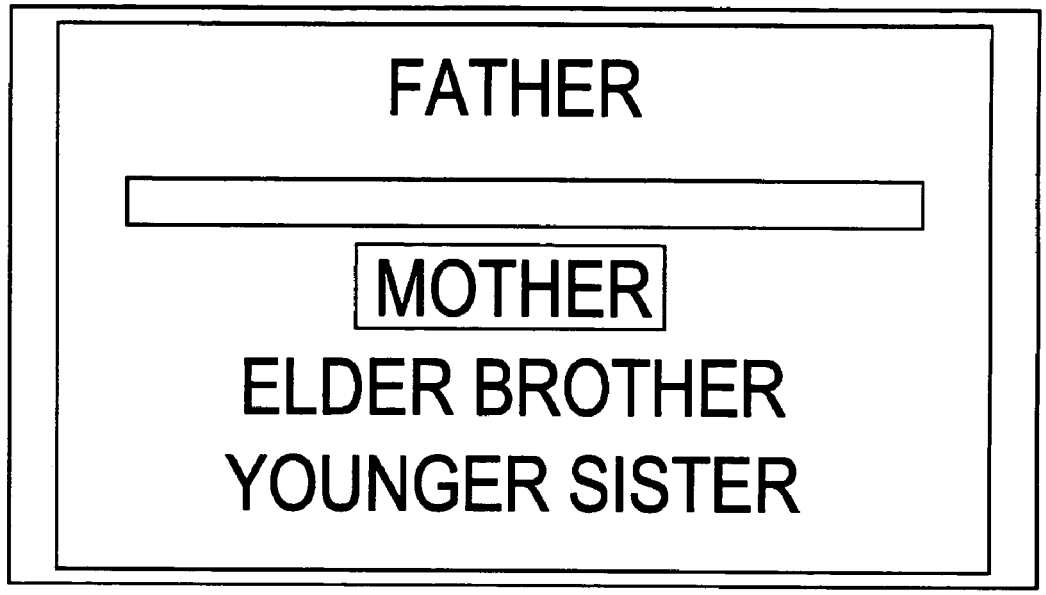
FIGS. 7A and 7B are diagrams illustrating still another example of switching from a menu screen to a program/RSS article introduction screen.
Figure 7B:
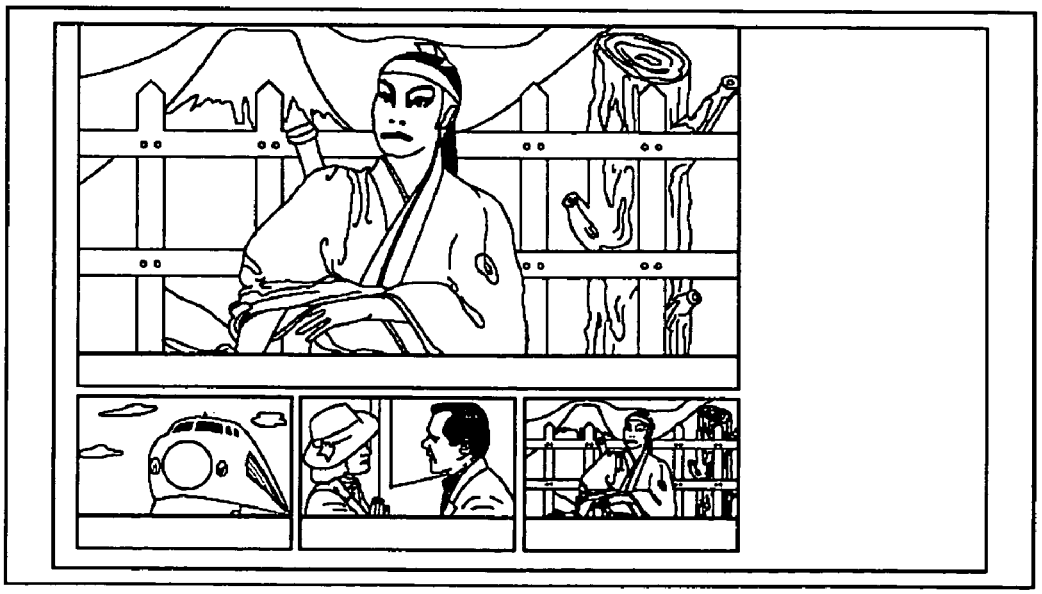

Also, when the user using the information processing apparatus 1 is a mother, and the icon of "mother" is selected as shown in FIG. 7A, if the "mother" is related to the RSS article delivery as shown in FIG. 7B, and the programs addressing a general topic are displayed on the program/RSS article introduction screen.

The programs and the RSS articles introduced by the program/RSS article introduction screen are switched by the user using the information processing apparatus 1, or at the timing of use in this manner, because the programs and the RSS articles are selected on the basis of the contents of the RSS articles delivered to the user and the topics at that time that have been determined from the RSS articles.

Figure 8:
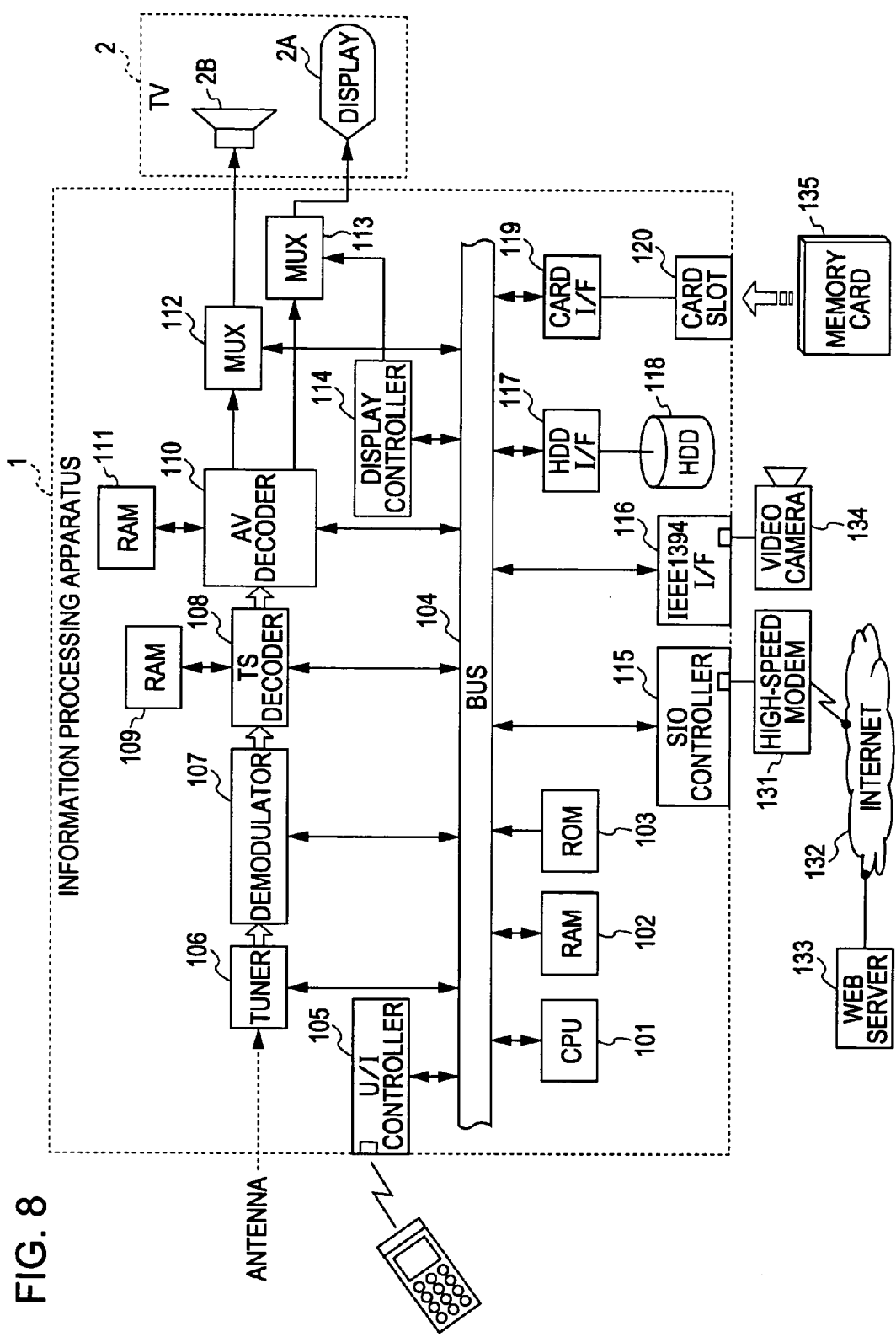
FIG. 8 is a block diagram illustrating an example of the hardware configuration of the information processing apparatus.

FIG. 8 is a block diagram illustrating an example of the hardware configuration of the information processing apparatus 1.

A CPU (Central Processing Unit) 101 executes programs stored in a ROM (Read Only Memory) 103 and programs loaded from an HDD 118 to a RAM (Random Access Memory) 102 through an HDD I/F 117 and a bus 104, and controls each section in accordance with, for example instructions (commands from a remote controller) of the user, which has been received by an U/I controller 105.

In this regard, Cell, which has been described in "Cell come into existence", Nikkei Electronics, Nikkei Business Publications, Feb. 28, 2005, p. 89 to p. 117, can be employed for the CPU 101.

A tuner 106 receives a broadcast signal from an antenna not shown and outputs the received signal to a demodulator 107 under the control of the CPU 101.

The demodulator 107 demodulates the received signal supplied from the tuner 106, and outputs the transport stream broadcast through a predetermined channel to a TS decoder 108.

The TS decoder 108 extracts a predetermined stream from the transport stream supplied from the demodulator 107 under the control of the CPU 101 using a RAM 109, and outputs packets constituting the extracted stream onto the bus 104 or an AV decoder 110. The packets (program data) supplied on the bus 104 are supplied to the HDD 118 through, for example the HDD I/F 117, and stored. Also, the EPG acquired by the TS decoder 108 is appropriately supplied to the HDD 118, and stored.

The AV decoder 110 decodes the video data (video packets) and audio data (audio packets) supplied from the TS decoder 108 using a RAM 111, and outputs the audio signal and the video signal obtained by the decoding to an MUX 112 and an MUX 113, respectively.

The MUX 112 outputs sound corresponding to the audio signal supplied from the AV decoder 110 from a speaker 2B of the TV 2.

The MUX 113 displays various screens and images, such as a program/RSS article introduction screen, etc., on a display 2A of the TV 2 on the basis of the video signal supplied from the AV decoder 110 and the video signal (OSD (On Screen Display) signal) supplied from a display controller 114.

The display controller 114 generates a video signal for displaying various images on a display 2A under the control of the CPU 101, and outputs the generated video signal to the MUX 113.

An SIO (Serial I/O) controller 115 connects to a Web server 133 through the Internet 132 by controlling a high-speed modem 131, and downloads an EPG, etc., as necessary. The EPG acquired by the download is supplied to the HDD 118, and stored. Also, the SIO controller 115 accesses a delivery site of the RSS articles registered by the user and receives the RSS articles. The RSS articles acquired by the receiving is also supplied to the HDD 118, and stored.

An IEEE (Institute of Electrical and Electronics Engineers) 1394 I/F 116 captures video data from a video camera which is connected through an IEEE 1394 cable.

An HDD I/F 117 stores the data supplied through the bus 104 into the HDD 118, and supplies the data stored in the HDD 118 to each section through the bus 104.

A card I/F 119 records the data supplied through the bus 104 onto a memory card 135 attached to a card slot 120. Also, the card I/F 119 reads the data recorded on the memory card 135, and outputs it onto the bus 104.

Figure 9:
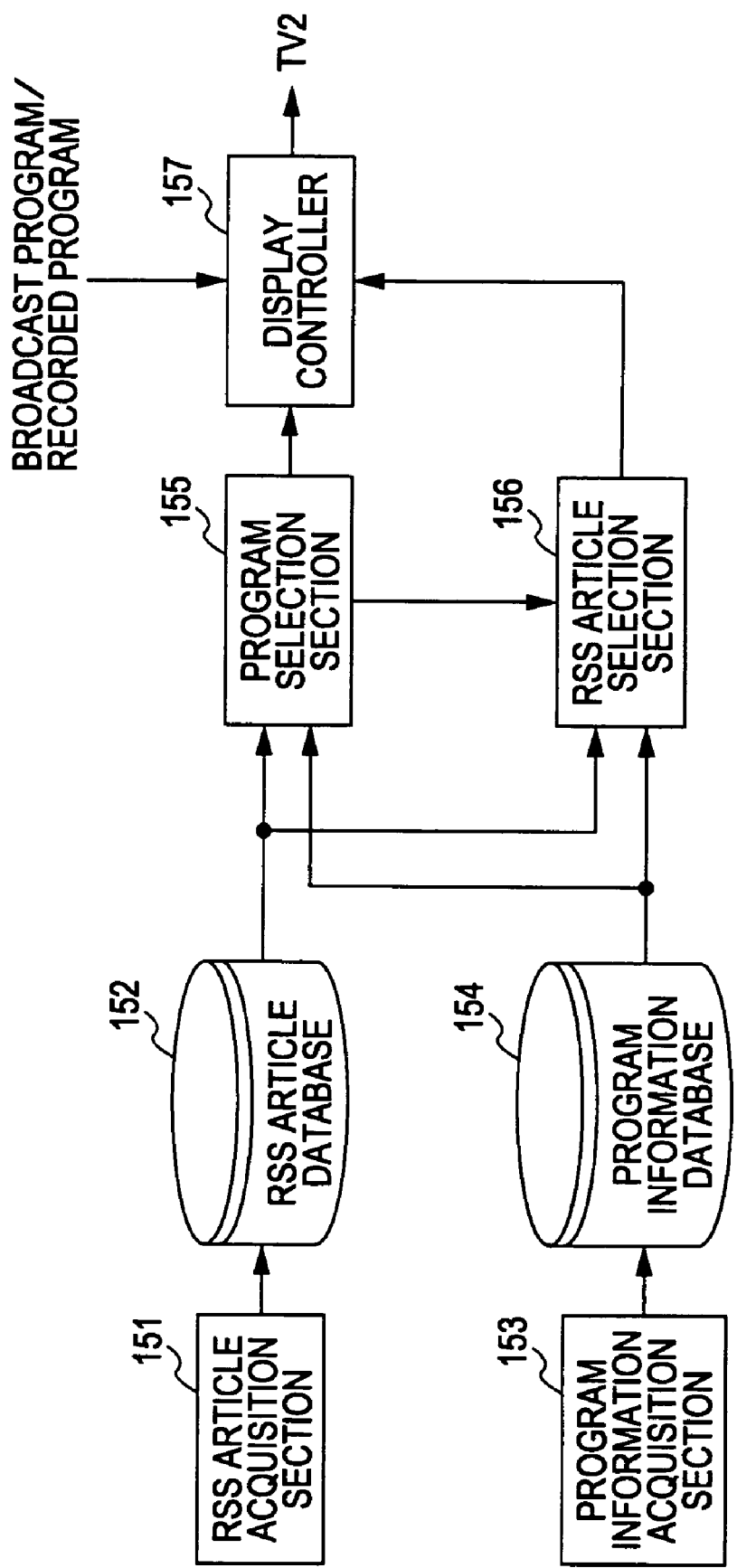
FIG. 9 is a block diagram illustrating an example of the functional configuration of the information processing apparatus.

FIG. 9 is a block diagram illustrating an example of the functional configuration of the information processing apparatus 1. At least a part of the functional sections shown in FIG. 9 is achieved by executing a predetermined program by the CPU 101 in FIG. 8.

The information processing apparatus 1 includes an RSS article acquisition section 151, an RSS article database 152, a program information acquisition section 153, a program information database 154, a program selection section 155, an RSS article selection section 156, and a display controller 157.

The RSS article acquisition section 151 controls the SIO controller 115, etc., and accesses the sites registered by the user in advance in order to acquire RSS articles. The acquisition of RSS articles is performed at a predetermined timing, such as when the user turns on the power to information processing apparatus 1, or when the user instructs to display a program/RSS article introduction screen (when the user selects a user's icon from the main menu), etc.

For example, a delivery site registered by a father, a delivery site registered by a mother, etc., are accessed in sequence, and the RSS articles are acquired from individual sites. When the user has registered a site to be the delivery source of the RSS articles, a profile information is created, and an access destination site is identified from the profile information of each user. The RSS articles acquired by the RSS article acquisition section 151 are output to the RSS article database 152, and stored. The stored RSS articles may be deleted when a predetermined time period has passed from the storage onto the RSS article database 152.

The program information acquisition section 153 acquires the program information of each program from the EPG data acquired by the TS decoder 108 from the broadcast wave, or the EPG data acquired from a predetermined server through the Internet 132, and stores the acquired program information into the program information database 154. The program information database 154 stores the program information of the recorded programs in addition to the program information of the programs being broadcast and to be broadcast.

The program selection section 155 extracts keywords from the RSS articles stored in the RSS article database 152, and gives rankings to the keywords in accordance with the number of keywords included in the RSS articles, etc. Also, the program selection section 155 refers to the program information database 154, and gives rankings to the programs whose program information includes high ranking keywords in accordance with the number of the included keywords, etc.

Also, the program selection section 155 selects a predetermined number of programs on the high rankings as programs of display candidates on the basis of the given rankings, and outputs the selected program information along with the rankings given for individual programs to the RSS article selection section 156 and the display controller 157. A detailed description will be given of the program selection section 155 below.

The RSS article selection section 156 selects the RSS articles related to the programs selected by the program selection section 155 with reference to the RSS articles stored in the RSS article database 152 and the program information stored in the program information database 154, and outputs the titles and the body texts of the RSS articles to the display controller 157. That is to say, the program selection section 155 selects the programs on the basis of the RSS articles, whereas the RSS article selection section 156 selects the RSS articles on the basis of the programs. A detailed description will be given of the RSS article selection section 156 below.

The display controller 157 acquires the images of the programs of the display candidates selected by the program selection section 155 from the HDD 118, etc., and displays individual programs on the program/RSS article introduction screen. For example, when the number of images of the programs to be displayed on the program/RSS article introduction screen is assumed to be four, if the program selection section 155 selects the programs of that number or more as display candidate programs, the display controller 157 selects only four programs from the display candidate programs, and the selected four programs are displayed in individual areas. Which program image is displayed in which area is determined by the rankings given to the program and user's operation.

Also, the display controller 157 displays the titles of the RSS articles in the vicinity of individual programs on the basis of the information supplied from the RSS article selection section 156, and displays the body text of the RSS article related to the program displayed on the main screen 11.

FIG. 10 is a block diagram illustrating an example of the detailed configuration of the program selection section 155 in FIG. 9.

A program keyword extraction section 171 reads the program information of each program from the program information database 154, and extracts keywords (program keywords) for each program by referencing dictionaries provided, etc. The program keywords extracted from the program information of each program are outputs to a program ranking creation section 174.

An RSS article keyword extraction section 172 reads all the RSS articles which are delivered to individual users and stored in the RSS article database 152, and extracts keywords (program keywords) by referencing dictionaries provided, etc. For example, if the father receives the RSS article delivery from three delivery sites, the RSS article keywords are extracted using all the RSS articles acquired from those delivery sites. The RSS article keywords extracted by the RSS article keyword extraction section 172 are output to an RSS article keyword ranking creation section 173.

The RSS article keyword ranking creation section 173 gives points to the RSS article keywords extracted from the RSS article keyword extraction section 172 in accordance with the number of keywords included in the RSS articles, etc., and creates the rankings of the RSS article keywords (RSS article keyword rankings). The points given to the keywords may be appropriately provided with predetermined weightings.

The keywords included in the RSS articles at many places are considered to be words representing the matters that have become general topics. Thus, a predetermined number of keywords listed on the higher rankings of the RSS article keywords created by the RSS article keyword ranking creation section 173 are output to the program ranking creation section 174 as topic keywords which represents current topics.

The program ranking creation section 174 determines whether the program keywords, for each program, supplied from the program keyword extraction section 171 include the topic keywords supplied from the RSS article keyword ranking creation section 173. If they include the topic keywords, the program ranking creation section 174 gives the points to each program in accordance with the number of the topic keywords included, and creates the rankings of the programs (program rankings).

A program whose program information includes the same words as the topic keywords is considered to be a program addressing the matters that have become current topics, and thus this program ranking is considered to represent the rankings of topic programs. In this regard, the points to be given to the programs may be provided with weightings in accordance with the rankings of the topic keywords included in the program keywords (the rankings in the RSS article keywords). The program rankings created by the program ranking creation section 174 are output to the selection section 175.

The selection section 175 selects a predetermined number of programs listed on the program rankings created by the program ranking creation section 174 as the display candidate programs, and outputs the display candidate programs to the RSS article selection section 156 and the display controller 157.

Figure 11:
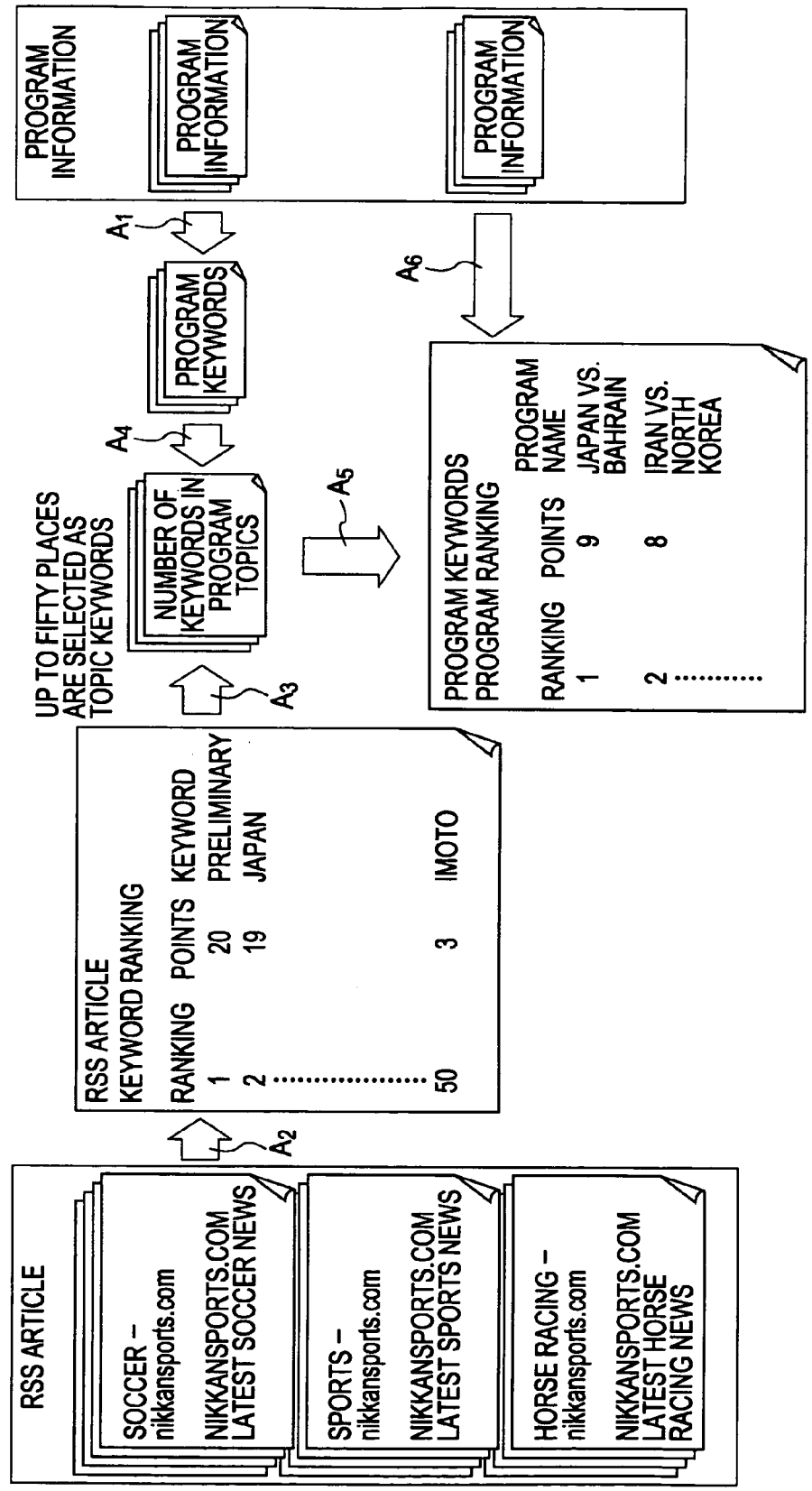
FIG. 11 is a diagram illustrating a processing flow.

FIG. 11 is a diagram illustrating the processing-flow by the program selection section 155.

For example, as shown by a solid-white arrow A1, program keywords are extracted from the program information of each program by the program keyword extraction section 171.

At the same time, as shown by a solid-white arrow A2, RSS article keywords are extracted from all the RSS articles that the user receives by the delivery by the RSS article keyword extraction section 172. The rankings of the extracted RSS article keywords are created by the RSS article keyword ranking creation section 173.

FIG. 11 illustrates an example of the case in which the father receives three RSS article deliveries, articles on soccer, articles on all sports, and articles on horse racing. Keywords are extracted from all of the articles on soccer, the articles on all sports, and the articles on horse racing. In the RSS article keyword rankings in FIG. 11, the "preliminary", to which 20 points are given, is the first keyword, and "Japan", to which 19 points are given, is the second keyword.

As shown by solid-white arrows A3 and A4, the number of topic keywords (the number of topic keywords in a program) included in the program keywords of each program is counted from the program keywords and the topic keywords, which are listed from the first to the 50th in the rankings of the RSS article keywords. The program is provided with points in accordance with that number, and the program rankings are created as shown by the destination of a solid-white arrow A5.

In the example of FIG. 11, "Japan vs. Bahrain", to which nine points are given, is the first program, and "Iran vs. North Korea", to which eight points are given, is the second program. The titles of the programs, such as "Japan vs. Bahrain", "Iran vs. North Korea", etc., can be acquired from the program information as shown by a solid-white arrow A6.

FIG. 12 is a diagram illustrating an example of program information of the program recorded by the father.

In the example of FIG. 12, sumo, horse racing, and soccer are the recorded programs. The program titles, the detailed information (program details) as shown in the figure are stored in the program information database 154.

FIG. 13 is a diagram illustrating an example of the program rankings created on the basis of the program information of FIG. 12, etc.

FIG. 13 shows an example of the program titles and the detailed information of seven higher-ranking programs. The first program is the program of "Japan vs. Bahrain", which includes eight topic keywords in the program information.

When the father selects his profile, and instructs to display the program/RSS article introduction screen, four high-ranking programs are selected from the programs listed on such program rankings, and they are displayed on individual areas of the program/RSS article introduction screen.

FIG. 14 is a diagram illustrating an example of the program information of the program recorded by the mother.

In the example of FIG. 14, variety programs in which idols appear on the stage and music programs are recorded programs. The program titles and the detailed information shown in the figure are stored in the program information database 154.

FIG. 15 is a diagram illustrating an example of the program rankings created on the basis of the program information of FIG. 14.

FIG. 15 shows an example of the program titles and the detailed information of seven higher-ranking programs. The first program is the program of "SNAP×SNAP", which includes four topic keywords in the program information.

When the mother selects her profile and instructs to display the program/RSS article introduction screen, four high-ranking programs are selected from the programs listed on such program rankings, and they are displayed on individual areas of the program/RSS article introduction screen.

In this regard, programs may not be selected for each one user, and programs may be selected on the basis of all the RSS articles that are individually delivered to a plurality of users (for example, all the family members), and those programs may be introduced as suitable programs to all the users.

Also, programs may be selected from the recorded programs by a plurality of users (for example, all the family members) on the basis of the RSS articles delivered to each user, and those programs may be introduced as suitable programs to each user.

FIG. 16 is a block diagram illustrating an example of the detailed configuration of the RSS article selection section 156 in FIG. 9.

A program keyword extraction section 181 reads the program information of the display candidate programs selected by the program selection section 155 from the program information database 154, and extracts the program keywords by referencing dictionaries provided, etc. The program keyword extraction section 181 creates a list of the program keywords, and outputs the created list to a selection section 183.

The RSS article keyword extraction section 182 extracts RSS article keywords from the individual RSS articles stored in the RSS article database 152 by referencing dictionaries provided, etc., and creates a list of the extracted RSS article keywords for each RSS article. That is to say, the RSS article keyword extraction section 182 creates one RSS article keyword list from one RSS article. The RSS article keyword list created by the RSS article keyword extraction section 182 is outputs to the selection section 183.

The selection section 183 performs matching between the program keywords listed on the list supplied from the program keyword extraction section 181 and the RSS article keywords on the list supplied from the RSS article keyword extraction section 182, and creates the rankings of the RSS articles in accordance with the number of the included program keywords. Also, the selection section 183 selects a predetermined number of RSS articles listed on the higher rankings of the created RSS articles, and outputs the title and the body text to the display controller 157.

Figure 17:
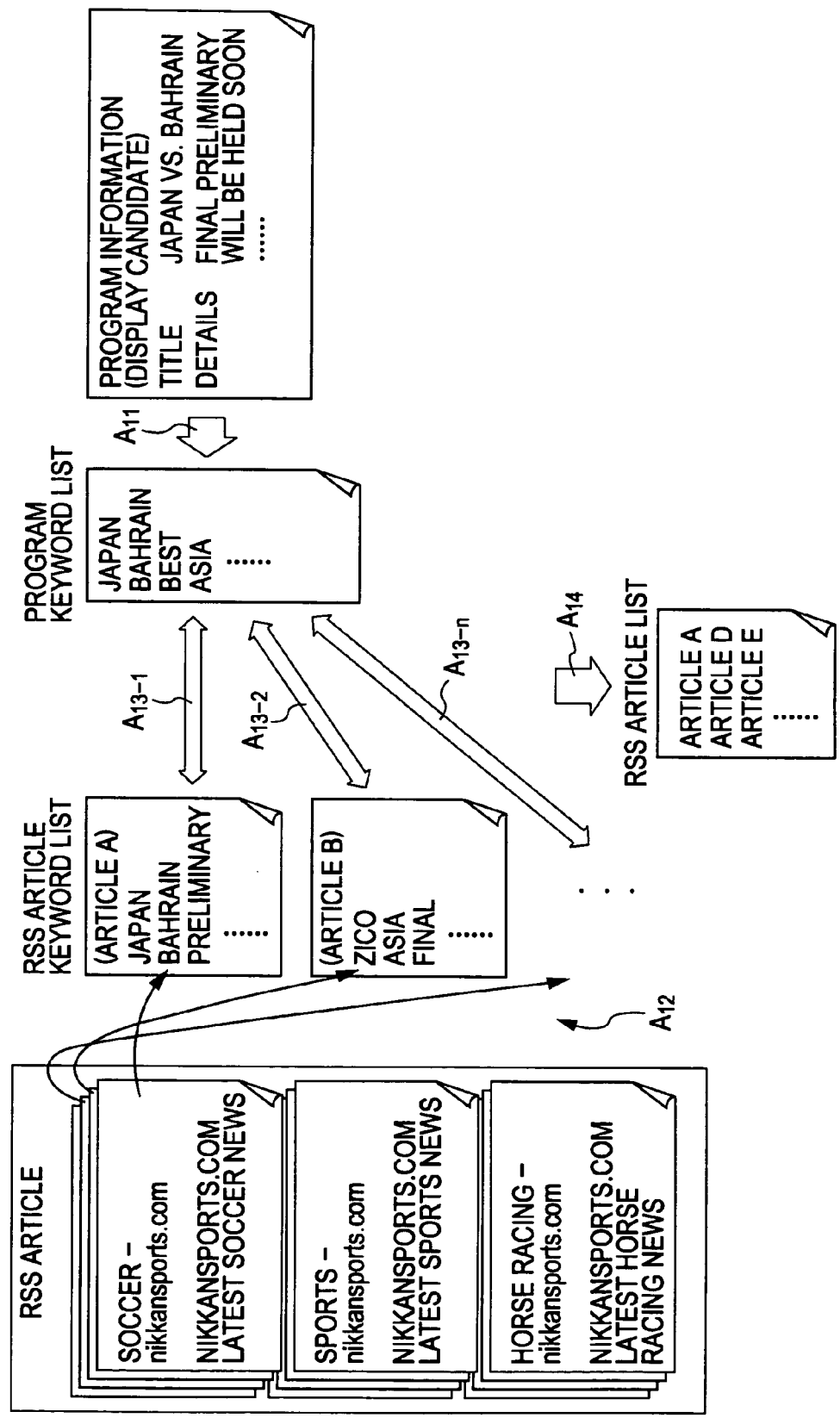
FIG. 17 is a diagram illustrating a processing flow.

FIG. 17 is a diagram illustrating the processing flow by the RSS article selection section 156.

For example, as shown by a solid-white arrow A11, program keywords are extracted from the program information of display candidate programs by the program keyword extraction section 181. In the example of FIG. 17, the title of the display candidate program is "Japan vs. Bahrain", and its detailed information is "final preliminary decisive match will be . . . ". Also; the keywords, "Japan", "Bahrain", "best", "Asia", are extracted as the program keywords from the detailed information, and these keywords are listed as the program keywords.

At the same time, as shown by a solid-white arrow A12, RSS article keyword lists are created from individual RSS articles. In the example of FIG. 17, from the RSS article A, which is an RSS article on soccer, the RSS article keyword lists including "Japan", "Bahrain", "preliminary", . . . are created, and from the RSS article B, which is an RSS article on soccer, the RSS article keyword lists including "Zico", "Asia", "decisive match", . . . are created.

As shown by solid-white arrows A13-1 to A13-n, matching is performed between the RSS article keywords on individual RSS article keyword list and the program keywords on the program keyword list, and thus as shown by the destination of the solid-white arrow A14, points are given in accordance with the number of program keywords included in the RSS article keywords to create a list (rankings) of RSS articles.

In the example of FIG. 17, the RSS article list includes RSS article A, RSS article D, RSS article E, . . . . A predetermined RSS articles are selected from this RSS article list, and the titles and the body texts of the RSS articles are displayed on the program/RSS article introduction screen.

Next, a description will be given of a series of processing of the information processing apparatus 1 having the above-described configuration.

First, a description will be given of the program selection/display processing of the information processing apparatus 1 with reference to the flowchart in FIG. 18.

In step S1, the CPU 101 determines whether program information (EPG) is being acquired or not. If it is being acquired, the CPU 101 waits until the end of the acquisition. The EPG acquired by the TS decoder 108 from a broadcast wave or the EPG acquired by the SIO controller 115 from a predetermined server is supplied to the HDD 118, and stored.

In step S1, when the CPU 101 determines that program information is not being acquired, or the acquisition has been completed, the CPU 101 proceeds to step S2. When the current state is waiting, a determination is made on whether there has been an instruction to turn the power on (the state capable of accepting a user's operation using a remote controller).

In step S2, when the CPU 101 determines that the power has been already on and there has been no instruction to turn on the power, the CPU 101 proceeds to step S3. The CPU 101 instructs to display a menu screen, and determines whether the category of the profile selection (user selection) has been selected from the menu screen. In step S3, when the CPU 101 determines that the display of a menu screen, etc., has not been instructed, the CPU 101 returns to step S1, and execute the above processing repeatedly.

On the other hand, in step S3, when the display of the menu screen is instructed and the CPU 101 determines that the category of profile selection has been selected, the CPU 101 proceeds to step S4, and the CPU 101 executes profile selection processing.

Also, in step S2, when it is determined that an instruction has been given to turn on the power, the processing also proceeds to step S4, and the CPU 101 executes profile selection processing. That is to say, the user can select profile and display program/RSS article introduction screen not only from the menu screen, but also from the screen displayed when instructed to turn on the power.

When profile is selected in step S4, the profile selection processing is completed, and the processing proceeds to step S5. The profile selection processing will be described below with reference to the flowchart in FIG. 19.

In step S5, the CPU 101 performs RSS article acquisition processing. The latest RSS articles are acquired by this processing, and the following processing is performed on the basis of the latest RSS articles. The RSS article acquisition processing will be described below with reference to the flowchart in FIG. 20.

In step S6, the CPU 101 performs program selection processing which selects programs to be introduced to the user. By this processing, candidate programs to be displayed on the program/RSS article introduction screen are selected. The program selection processing will be described below with reference to the flowchart in FIG. 21.

In step S7, the CPU 101 performs selected program display processing which displays a predetermined programs from the display candidate programs selected in the program selection processing in step S6 to be displayed on the RSS article introduction screen. The selected program display processing will be described below with reference to the flowchart in FIG. 22.

Figure 23:
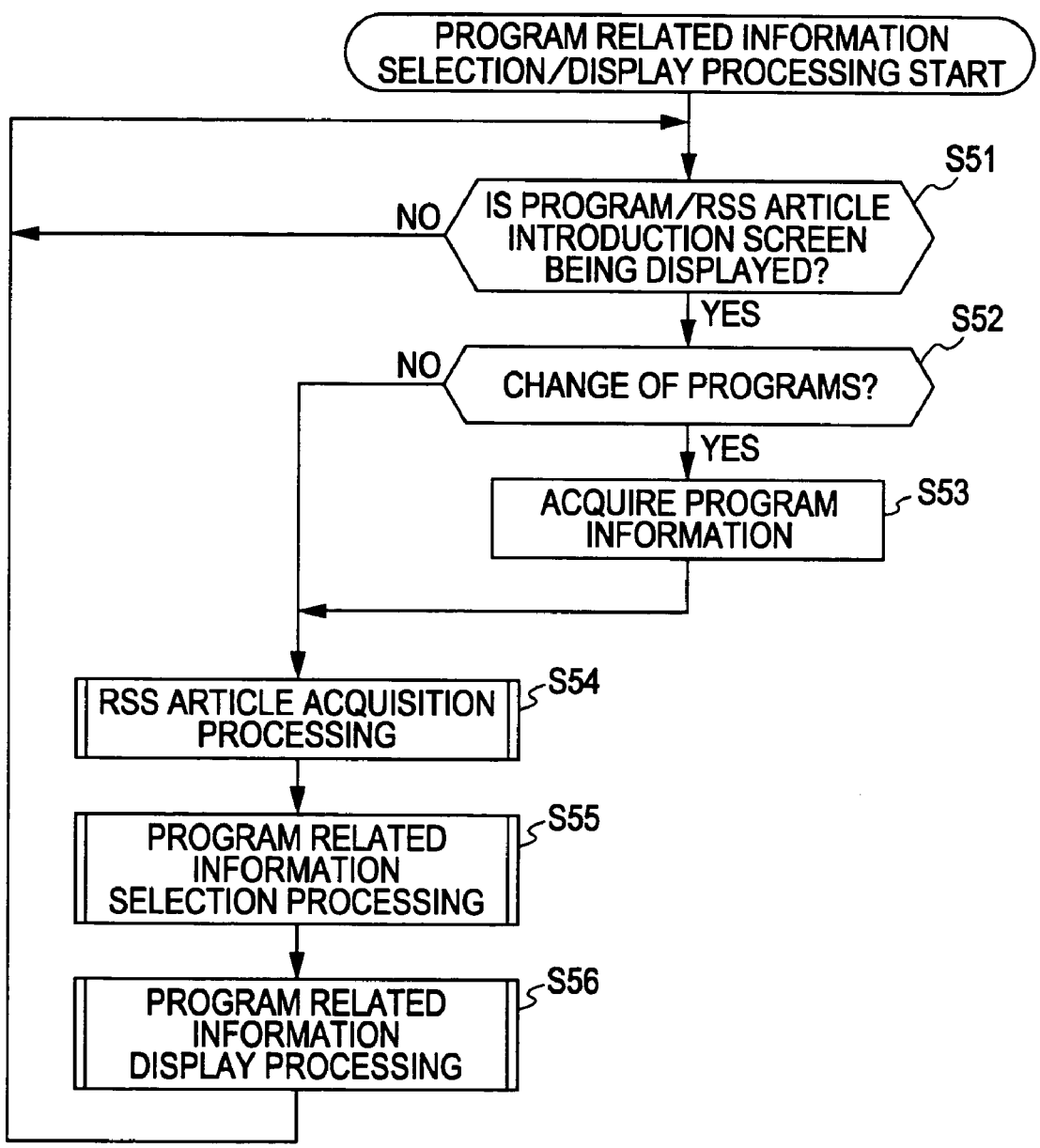
FIG. 23 is a flowchart illustrating the program related information selection/display processing of the information processing apparatus.

In this regard, the selection processing of RSS article articles introduced as program related information is performed in parallel with the above-described processing. The title and the body text of the RSS article articles are displayed at the same timing as the display of the programs by the processing of step S7. That is to say, the below-described processing in FIG. 23 is performed in parallel with the processing in FIG. 18. For example, the processing of step S56 (program related information display processing) in FIG. 23 is performed at the same timing as the processing of step S7 in FIG. 18, and thus the titles and the body texts of the program and the RSS-articles are displayed on the program/RSS article introduction screen.

When an instruction has given to complete the display of the program/RSS article introduction screen, the processing returns to step Si, and the subsequent processing is performed.

Next, a description will be given of the profile selection processing performed in step S4 in FIG. 18 with reference to the flowchart in FIG. 19.

When a category of profile selection is selected from the menu screen, in step S11, the CPU 101 displays a screen (profile selection screen), as shown in FIG. 5A, in which the icons of the registered profiles such as "father", "mother", etc., are displayed in an arrangement in a vertical direction. At this time, the user can select his/her own profile by the operation in the vertical direction using a remote controller, etc.

When a profile is selected by the user, the CPU 101 accepts it in step S12. Then, the processing returns to step S4 in FIG. 18, and the subsequent processing is performed.

Figure 20:
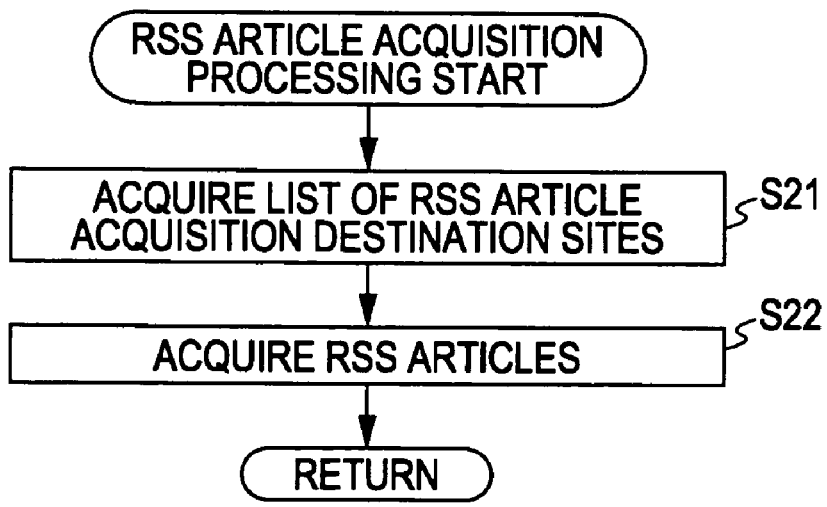
FIG. 20 is a flowchart illustrating the RSS article acquisition processing performed in step S5 in FIG. 18.

Next, a description will be given of the RSS article acquisition processing performed in step S5 in FIG. 18 with reference to the flowchart in FIG. 20.

In step S21, the RSS article acquisition section 151 (FIG. 9) of the CPU 101 acquires a list of sites to be the RSS article acquisition destination from the information of the profile selected in the profile selection processing. That is to say, a list of the delivery sites of the RSS articles is provided for each user, and the URLs (Uniform Resource Locators) of the delivery sites, etc., are described on the list.

In step S22, the RSS article acquisition section 151 accesses the delivery sites of all the RSS articles on the list, acquires the RSS articles, and stores the acquired RSS articles into the RSS article database 152. Then, the processing returns to step S5 in FIG. 18, and the subsequent portion is performed.

Figure 21:
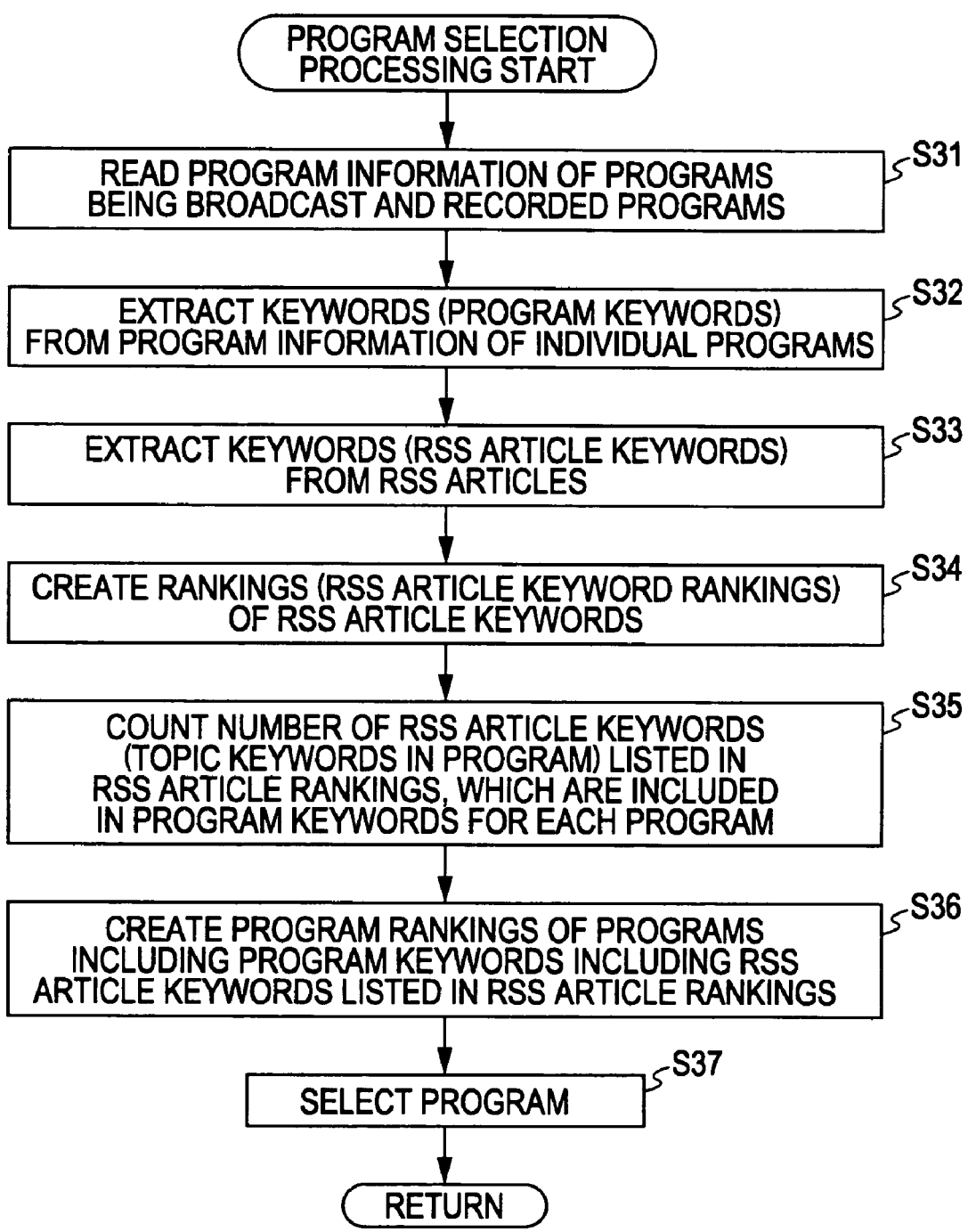
FIG. 21 is a flowchart illustrating the program selection processing performed in step S6 in FIG. 18.

Next, a description will be given of the program selection processing performed in step S6 in FIG. 18 with reference to the flowchart in FIG. 21.

In step S31, the program keyword extraction section 171 (FIG. 10) of the CPU 101 reads the program information of a program being broadcast or a recorded program from the program information database 154, proceeds to step S32, and extracts program keywords for each program. The program keywords extracted by the program keyword extraction section 171 are output to the program ranking creation section 174.

In step S33, the RSS article keyword extraction section 172 reads all the RSS articles delivered to the user from the RSS article database 152, and extracts the RSS article keywords from the read RSS articles. The RSS article keywords extracted by the RSS article keyword extraction section 172 are outputs to the RSS article keyword ranking creation section 173.

In step S34, the RSS article keyword ranking creation section 173 gives points to the RSS article keywords extracted by the RSS article keyword extraction section 172 in accordance with the number of the keywords included in the RSS articles, and creates RSS article keyword rankings. The keywords on the RSS article keyword rankings that are created by this processing, for example top 50, are output to the program ranking creation section 174 as topic keywords.

In step S35, the program ranking creation section 174 determines whether the topic keywords supplied from the RSS article keyword ranking creation section 173 are included in the program keywords of each program supplied from the program keyword extraction section 171. If included, the program ranking creation section 174 counts the number of topic keywords (topic keywords in the program) included in the program.

The program ranking creation section 174 proceeds to step S36, gives points in accordance with the number of topic keywords in the program counted in step S35 to each program, and creates the program rankings. The program rankings created by the program ranking creation section 174 are output to the selection section 175.

In step S37, the selection section 175 selects a predetermined number of programs listed at the high rankings on the program rankings created by the program ranking creation section 174 as programs for display candidates, and outputs the information of the selected programs to the RSS article selection section 156 and the display controller 157. Then, the processing returns to step S6 in FIG. 18, and the subsequent processing is performed.

In this regard, the processing for selecting programs is not limited to the above processing. That is to say, the processing having any procedure may be used if the matters that have become general topics by the RSS articles are analyzed and the programs matching to the matters are selected on the basis of the program information.

Figure 22:
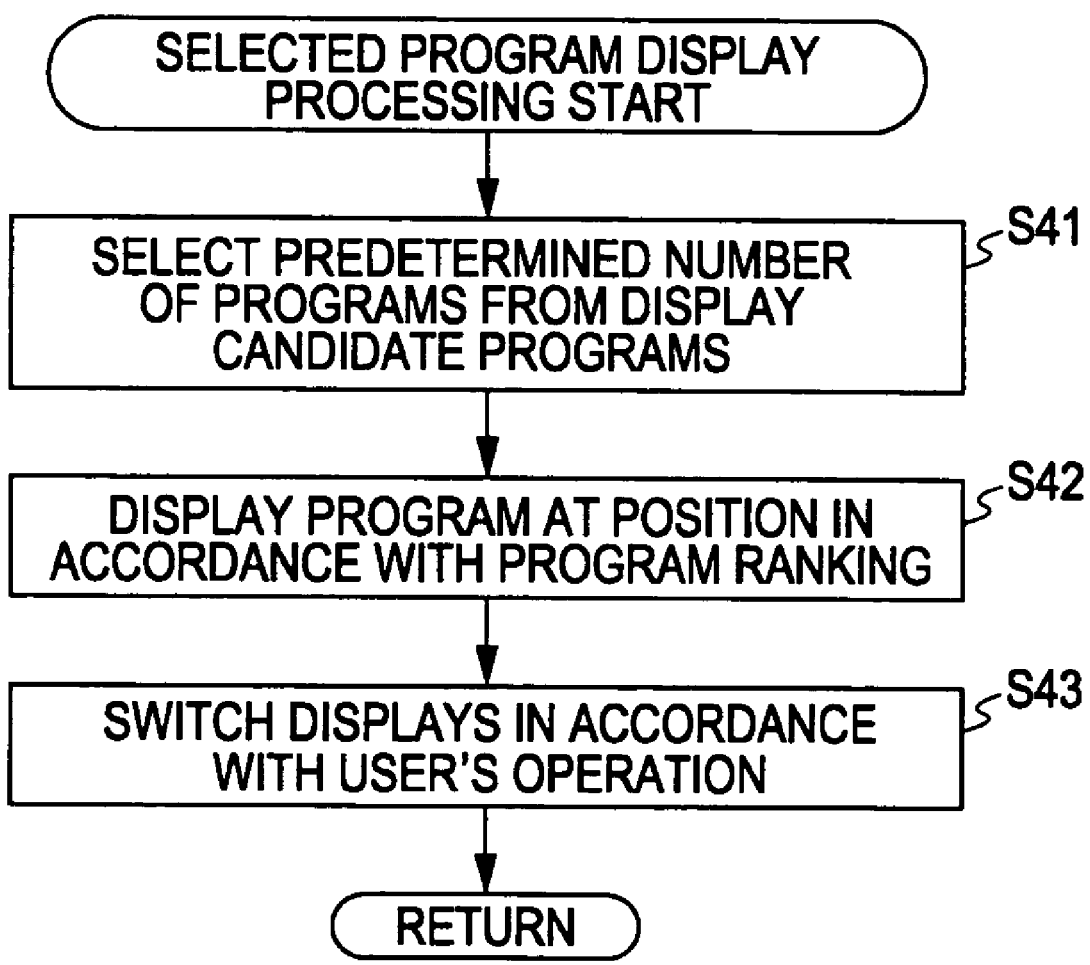
FIG. 22 is a flowchart illustrating the selected program display processing performed in step S7 in FIG. 18.

Next, a description will be given of the selected program display processing performed in step S7 in FIG. 18 with reference to the flowchart in FIG. 22.

In step S41, the display controller 157 selects the same number of programs as the number of programs to be displayed on the program/RSS article introduction screen from the programs of the display candidates selected by the program selection section 155. Here, for example the same number of programs as the number of programs to be displayed on the program/RSS article introduction screen are selected from the first program ranking in sequence.

In step S42, the display controller 157 displays the program selected in step S41 at the position in accordance with the ranking given to each program in order for the program having a higher ranking to be displayed in a bigger size. That is to say, when four programs are selected, the program having the highest ranking is displayed on the main screen 11, and the other programs are displayed in sub-screens 12-1 to 12-3.

In step S43, the display controller 157 switches the displays of the program/RSS article introduction screen in accordance with the user's operation, etc.

For example, the display controller 157 displays only the selected program on the full screen of the TV 2 when one recorded program is selected and the reproduction of the program is instructed. Also, if the selected program is a program being broadcast, the display controller 157 displays a menu screen of operations capable of performing on the program being broadcast, etc. The user can instruct to record the introduced program being broadcast from this menu screen, etc.

Further, when an instruction is given to switch programs displayed in the main screen 11 and the sub-screens 12-1 to 12-3, the program selection section 155 displays the other display candidate programs that are not currently displayed.

Figure 18:
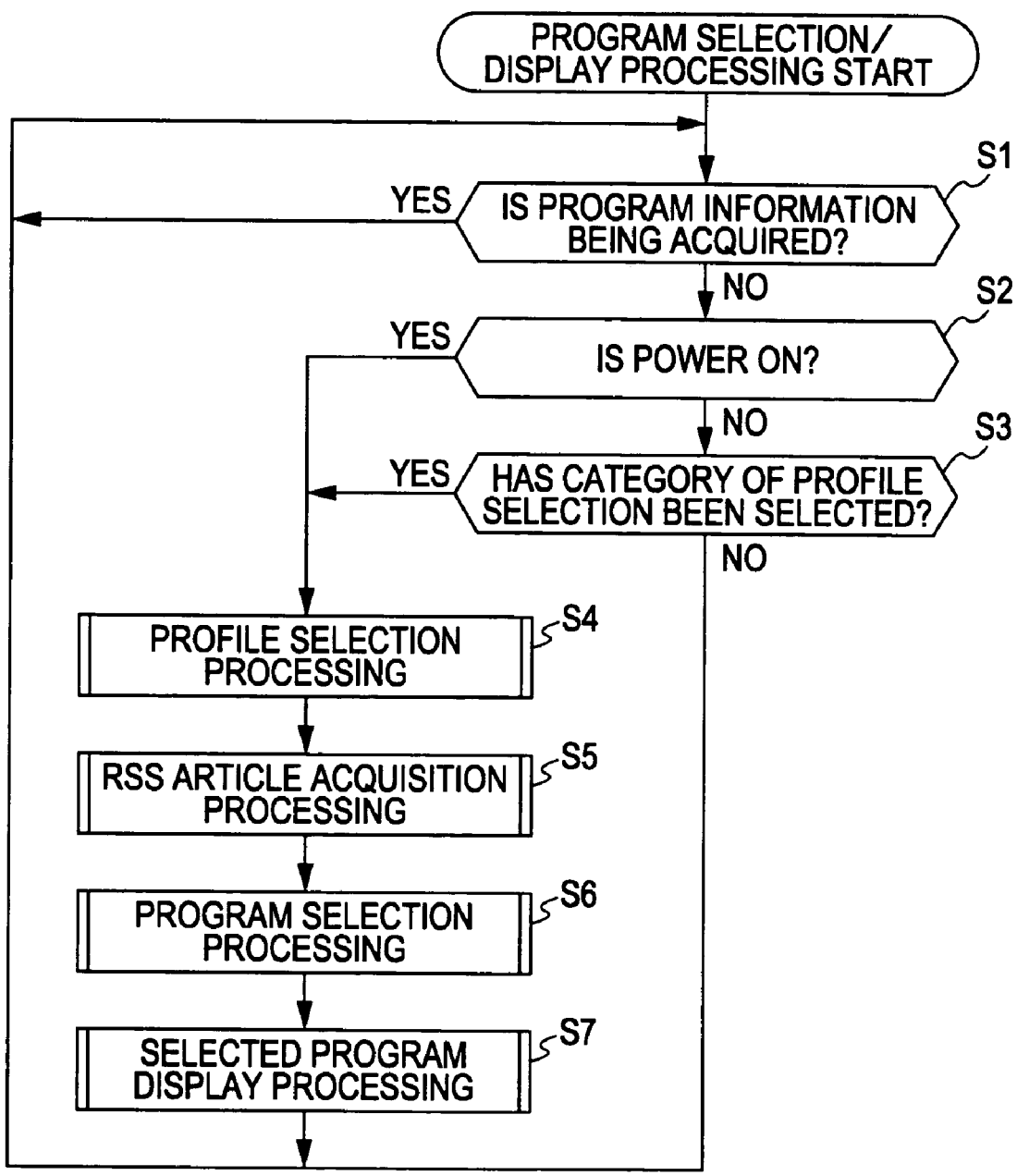
FIG. 18 is a flowchart illustrating the program selection/display processing of the information processing apparatus.
Figure 19:
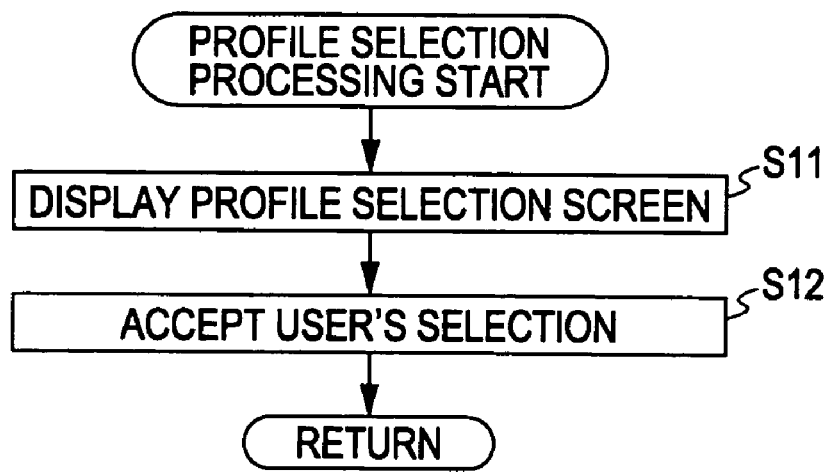
FIG. 19 is a flowchart illustrating the profile selection processing performed in step S4 in FIG. 18.

When the completion of the display of the program/RSS article introduction screen is instructed, the processing returns to step S7 in FIG. 18, and the processing of step S1 and after are repeatedly performed.

Next, a description will be given of the program related information selection/display processing of the information processing apparatus 1 with reference to the flowchart in FIG. 23.

In step S51, the CPU 101 determines whether the program/RSS article introduction screen is being displayed, and waits until it is being displayed.

For example, when the program/RSS article introduction screen is displayed (when the program of display candidate is selected by the processing of FIG. 18), or the program/RSS article introduction screen has already been displayed, in step S51, the CPU 101 determines that the program/RSS article introduction screen is being displayed, and the processing proceeds to step S52.

In step S52, the CPU 101 determines whether the program to be displayed on the program/RSS article introduction screen is changed. In step S52, if the CPU 101 determines that the program is to be changed, the processing proceeds to step S53.

When the CPU 101 acquires the program information in step S53, or determines not to change the program in step S52, the processing proceeds to step S54.

In step S54, the CPU 101 performs the RSS article acquisition processing. Here, the latest RSS articles are obtained by the same processing as the processing described with reference to FIG. 20, and the subsequent processing is performed on the basis of the acquired RSS articles.

In step S55, the CPU 101 performs the program related information selection processing, and selects the RSS articles as the information related to the programs displayed on the program/RSS article introduction screen. The program related information selection processing will be described below with reference to the flowchart of FIG. 24.

In step S56, the CPU 101 performs the program related information display processing to display the titles and the body texts of the RSS articles selected in the processing of step S55 onto the program/RSS article introduction screen. The processing of this step S56 is performed at the same timing as the processing of step S7 in FIG. 18, and thus the program/RSS article introduction screen as shown in FIG. 2 is displayed. The program related information display processing will be described below with reference to the flowchart of FIG. 25.

When the completion of the display of the program/RSS article introduction screen is instructed, the processing returns to step S51, and the subsequent processing is performed.

Figure 24:
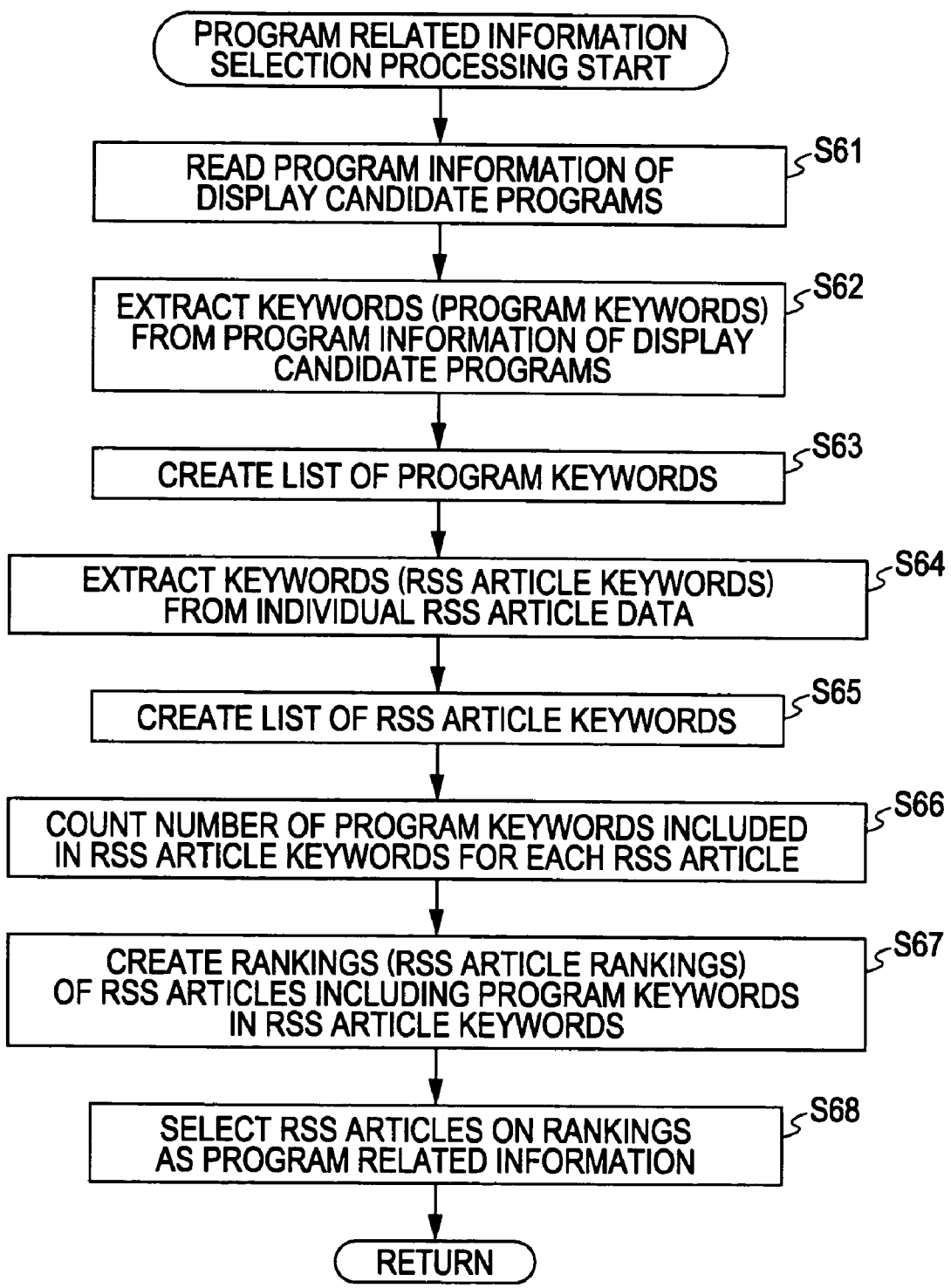
FIG. 24 is a flowchart illustrating the program related information selection processing performed in step S55 in FIG. 23.

Next, a description will be given of the program related information selection processing performed in step S55 in FIG. 23 with reference to the flowchart in FIG. 24.

In step S61, the program keyword extraction section 181 (FIG. 16) of the CPU 101 reads program information of the display candidates selected by the program selection section 155 from the program information database 154, proceeds to step S62, and extracts program keywords.

In step S63, the program keyword extraction section 181 creates a list of the program keywords extracted in step S62, and outputs the created list to the selection section 183.

In step S64, the RSS article keyword extraction section 182 extracts RSS article keywords from individual keywords stored in the RSS article database 152, proceeds to step S65, and creates a list of the RSS article keywords extracted in step S64. The list of the RSS article keywords created by the RSS article keyword extraction section 182 is output to the selection section 183.

In step S66, the selection section 183 performs matching between the program keywords on the program keyword list supplied from the program keyword extraction section 181 and the RSS article keywords on the RSS article keyword list supplied from the RSS article keyword extraction section 182, and counts the number of program keywords included in the RSS article keywords extracted from the individual RSS articles.

In step S67, the selection section 183 creates the rankings of the RSS articles in accordance with the number of the program keywords included from the processing result of step S66, and the processing proceeds to step S68.

In step S68, the selection section 183 selects a predetermined number of the RSS articles on the higher rankings of the RSS article rankings as the program related information, and outputs the selected RSS articles to the display controller 157. Then, the processing returns to step S55 in FIG. 22, and the subsequent processing is performed.

The above processing is performed for each display candidate program, and thus one RSS article ranking is created for one display candidate program, and the RSS articles on the list are selected as the program related information.

In this regard, the processing for selecting the RSS articles is not limited to the above processing. That is to say, the processing may be performed by any procedure provided that the RSS articles related to the display candidate program selected by any procedure is selected on the basis of the RSS articles and the program information.

Figure 25:
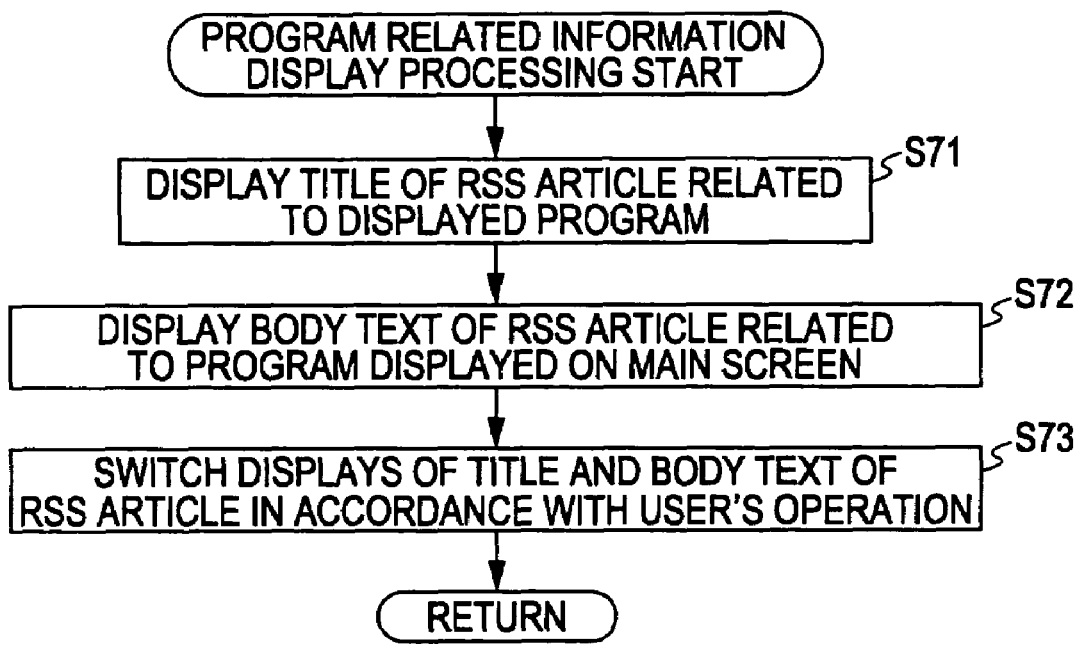
FIG. 25 is a flowchart illustrating the program related information display processing performed in step S56 in FIG. 23.

Next, a description will be given of the program related information display processing performed in step S56 in FIG. 23 with reference to the flowchart in FIG. 25.

In step S71, the display controller 157 displays the title of the RSS articles related to individual programs to be displayed on the program/RSS article introduction screen in the vicinity of the individual programs.

Thus, for example, the title of the RSS article related to the program displayed on the main screen 11 is displayed in the RSS article title display section 11A provided below the main screen 11. Also, the titles of the RSS articles related to the programs displayed on sub-screens 12-1 to 12-3 are displayed in the RSS article title display sections 12-1A to 12-3A provided below the sub-screens 12-1 to 12-3. The title of the RSS article to be displayed immediately after the display of the program/RSS article introduction screen is, for example the title of the RSS article having the highest ranking among the RSS article rankings created by the selection section 183.

In step S72, the display controller 157 displays the body text of the RSS article (the body text of the RSS article whose title is displayed in the RSS article title display section 11A) related to the program displayed on the main screen 11 in the RSS article text display section 11B. Thus, the user is allowed to determine whether to view the program displayed on the main screen 11 while reading the body text.

In step S73, the display controller 157 switches the displays of the titles and the body texts of the RSS articles in accordance with the user's operation, etc.

For example, when a title of an RSS article is selected, the display controller 157 displays the body text and the content of the RSS article. Also, a plurality of RSS articles are selected as related information for one program, and thus, for example the display controller 157 displays the titles and the body texts of individual RSS articles in sequence at a predetermined time intervals in accordance with the given rankings.

Here, a description will be given of the switching of displays of RSS articles.

Figure 26:
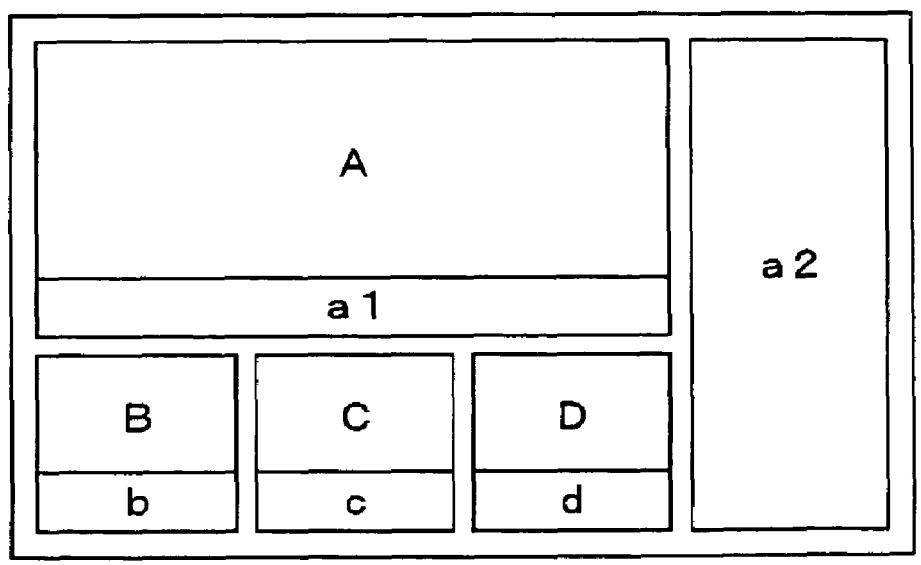
FIG. 26 is a diagram illustrating display areas.

FIG. 26 is a diagram illustrating display areas of the TV 2.

In FIG. 26, the main screen 11 in FIG. 2 is represented by an area A, the RSS article title display section 11A is represented by an area a1, and the RSS article text display section 11B is represented by an area a2. Also, sub-screens 12-1 to 12-3 are represented by areas B to D, respectively. The RSS article title display sections 12-1A to 12-3A are represented by areas b to d, respectively.

Figure 27:
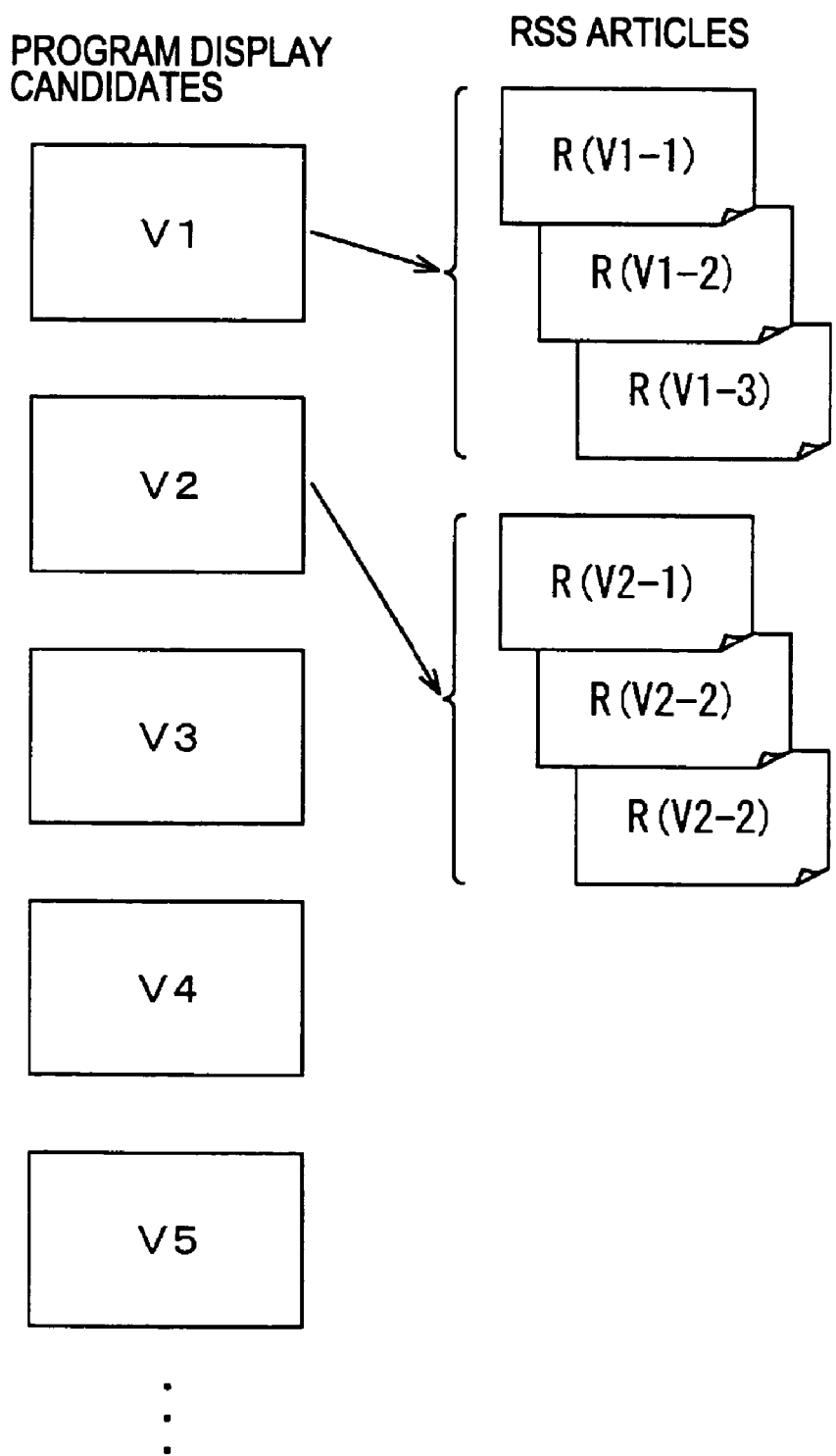
FIG. 27 is a diagram illustrating display candidate programs and the RSS articles that are related information thereof.

FIG. 27 is a diagram illustrating display candidate programs and the RSS articles that are related information thereof.

In FIG. 27, programs V1, V2, V3, V4, V5, . . . are shown as candidate programs. Among these programs, the program V1 has RSS articles R(V1-1), R(V1-2), and R(V1-3) as related RSS articles, and the program V2 has RSS articles R(V2-1), R(V2-2), and R(V2-3) as related RSS articles. For the other programs subsequent to the program V2, the RSS articles are selected as the related information.

FIG. 28 is a diagram illustrating an example of switching displays.

In the upper display of FIG. 28, the program V1 is shown in the area A, the title of the RSS article R(V1-1), which is one piece of related information of the program V1, R.t(V1-1), is shown in the area a1, and the body text of the RSS article R(V1-1), R.d(V1-1), is shown in the area a2.

Also, in the upper display of FIG. 28, the program V2 is shown in the area B, the title of the RSS article R(V2-1), which is one piece of related information of the program V2, R.t(V2-1), is shown in the area b. The program V3 is shown in the area C, the title of the RSS article R(V3-1), which is one piece of related information of the program V3, R.t(V3-1), is shown in the area c. Similarly, program V4 is shown in the area D, the title of the RSS article R(V4-1), which is one piece of related information of the program V4, R.t(V4-1), is shown in the area d.

Such a display is switched to the lower display in FIG. 28 at a predetermined timing, such as an elapse of a predetermined time period, or when the user carries out a predetermined operation, etc.

In the lower display of FIG. 28, the title of the RSS article R(V1-2), which is one piece of related information of the program V1, R.t(V1-2), is shown in the area a1, and the body text of the RSS article R(V1-2), R.d(V1-2) is shown in the area a2.

Also, the title of the RSS article R(V2-2), which is one piece of related information of the program V2, R.t(V2-2), is shown in the area b, the title of the RSS article R(V3-2), which is one piece of related information of the program V3, R.t(V3-2), is shown in the area c, and the title of the RSS article R(V4-2), which is one piece of related information of the program V4, R.t(V4-2), is shown in the area d.

That is to say, this example shows a case in which the program are displayed in individual areas without change, and the RSS articles introduced to the user are switched after the elapse of a predetermined time. Thus, the user is allowed to select a program while viewing the RSS article titles being switched and the body text of the RSS article displayed in the RSS article text display section 11B.

Figure 29:
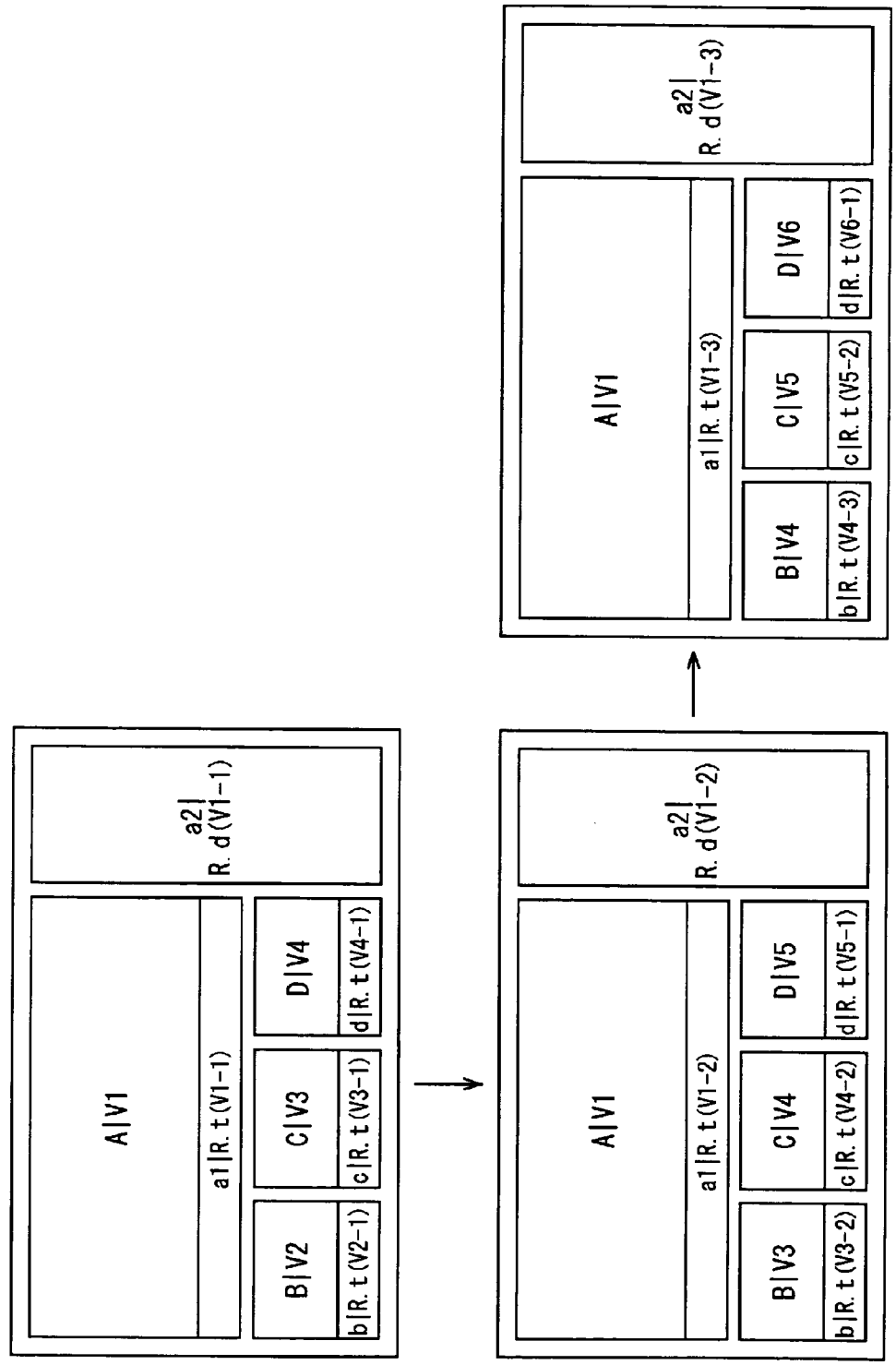
FIG. 29 is a diagram illustrating another example of switching displays.

FIG. 29 is a diagram illustrating another example of switching displays.

The upper left display of FIG. 29 is the same as the upper display of FIG. 28. Such a display is switched to the lower left display of FIG. 29 at a predetermined timing, such as an elapse of a predetermined time period, or when the user carries out a predetermined operation, etc.

In the lower left display of FIG. 29, the title of the RSS article R(V1-2), which is one piece of related information of the program V1, R.t(V1-2), is shown in the area a1, and the body text of the RSS article R(V1-2), R.d(V1-2) is shown in the area a2.

Also, in the lower left display of FIG. 29, the program V3 is shown in the area B, the title of the RSS article R(V3-2), which is one piece of related information of the program V3, R.t(V3-2), is shown in the area b. The program V4 is shown in the area C, the title of the RSS article R(V4-2), which is one piece of related information of the program V4, R.t(V4-2), is shown in the area c. Similarly, program V5 is shown in the area D, the title of the RSS article R(V5-1), which is one piece of related information of the program V5, R.t(V5-1), is shown in the area d.

Further, such a display is switched to the lower right display of FIG. 29 at a predetermined timing, such as an elapse of a predetermined time period, or when the user carries out a predetermined operation, etc.

In the lower right display of FIG. 29, the title of the RSS article R(V1-3), which is one piece of related information of the program V1, R.t(V1-3), is shown in the area a1, and the body text of the RSS article R(V1-3), R.d(V1-3) is shown in the area a2.

Also, in the lower right display of FIG. 29, the program V4 is shown in the area B, the title of the RSS article R(V4-3), which is one piece of related information of the program V4, R.t(V4-3), is shown in the area b. The program V5 is shown in the area C, the title of the RSS article R(V5-2), which is one piece of related information of the program V5, R.t(V5-2), is shown in the area c. Similarly, program V6 is shown in the area D, the title of the RSS article R(V6-1), which is one piece of related information of the program V6, R.t(V6-1), is shown in the area d.

That is to say, the example of FIG. 29 shows a case in which the program is displayed in the areas A without change, and the programs displayed in the areas B to D are switched to be moved in the left direction in sequence.

Specifically, when the displays are switched, for the areas B to D, the program that has been displayed in the leftmost area B so far disappears, and the program that has been displayed in the area C is displayed there. Also, the program that has been displayed in the area D is displayed in the area C. The program that has not been displayed is displayed in the rightmost area D.

Further, the display position of the titles, the body texts of the RSS articles related to the program are moved along with the move of the display position of the program, and the contents (types of the RSS articles) are switched in sequence in the same manner as the case of FIG. 28.

Figure 30:
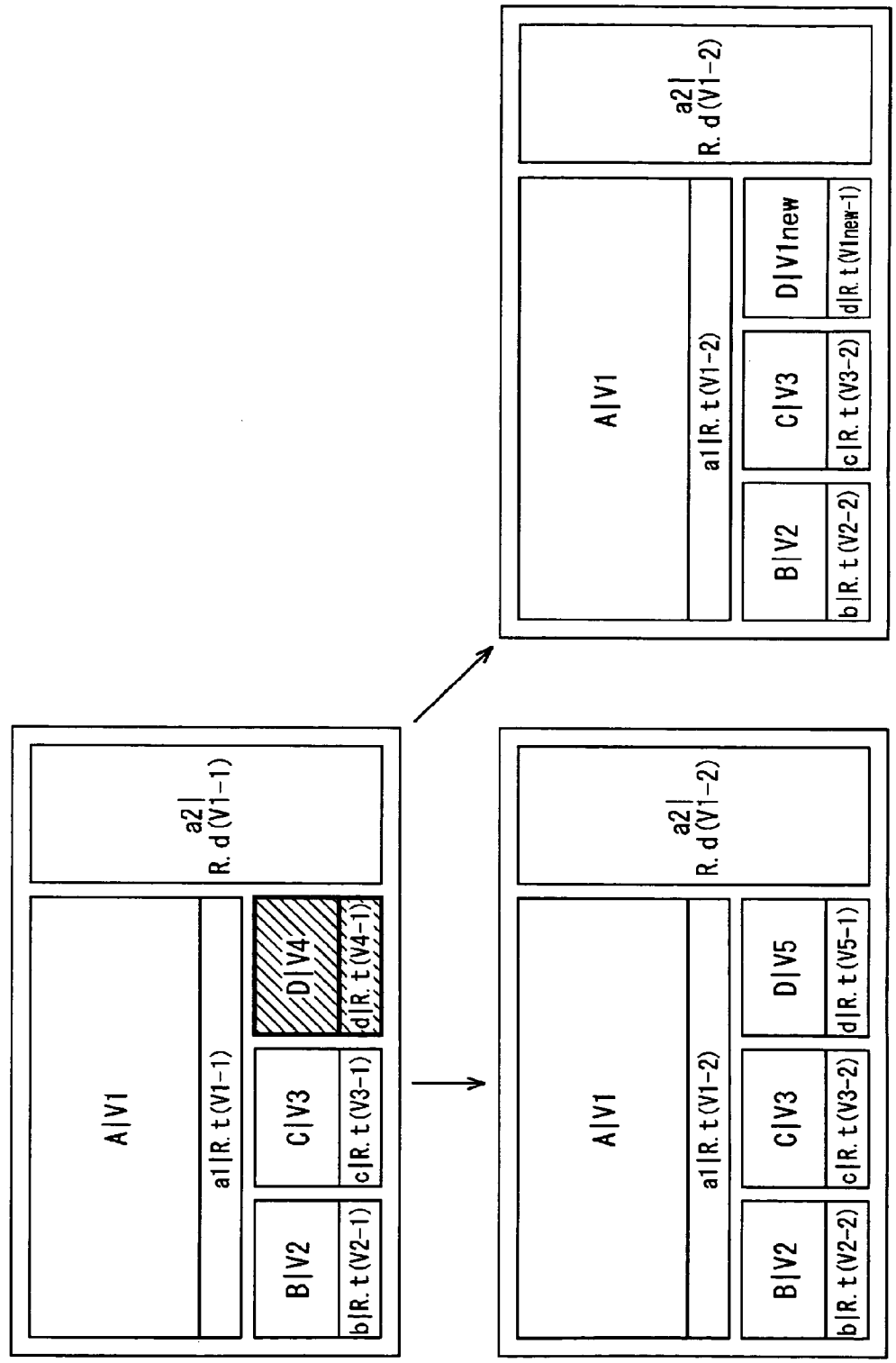
FIG. 30 is a diagram illustrating still another example of switching displays.

FIG. 30 is a diagram illustrating still another example of switching displays.

The upper left display of FIG. 30 is the same as the upper display of FIG. 28. In such a state, for example when the program V4 (the program V4 and the title of the RSS article R(V4-1), R.t(V4-1), displayed in the area d) displayed in the area D is selected and is instructed to be deleted, for example the display of the TV 2 is switched to the lower left display of FIG. 30.

In the lower left display in FIG. 30, the title of the RSS article R(V1-2), which is one piece of related information of the program V1, R.t(V1-2), is shown in the area a1, the body text of the RSS article R(V1-1), which is the body text of the program V1, R.d(V1-2), is shown in the area a2. The title of the RSS article R(V2-2), which is one piece of related information of the program V2, R.t(V2-2), is shown in the area b. The title of the RSS article R(V3-2), which is one piece of related information of the program V3, R.t(V3-2), is shown in the area c.

Further, in the lower left display of FIG. 30, the program V5 is shown in the area D, the title of the RSS article R(V5-1), which is one piece of related information of the program V5, R.t(V5-1), is shown in the area d.

Also, the upper left display of FIG. 30 may be switched to the lower right display of FIG. 30 by the user's operation.

In the lower right display of FIG. 30, the program V1new is shown in the area D, the title of the RSS article R(V1new-1), which is one piece of related information of the program V1new, R.t(V1new-1), is shown in the area d, which is different from the lower left display of FIG. 30. The other displays are the same. Here, the program V1new is, a so-called counter program, for example which is broadcast in the same time slot as the program V1 that is displayed in the area A.

That is to say, the example of FIG. 30 shows the case in which when a user selects a certain program (program and the title of the RSS article) and deletes it, another program and the title of the RSS article related to that program are displayed in place of the certain program. In this manner, the user is allowed to perform various kinds of operations, such as deletion of the program displayed on the program/RSS article introduction screen, etc.

As described above, the program to be introduced to the user is displayed at a different position or in an area in different size in accordance with the rankings given on the basis of the program information and the RSS article. However, the difference in the ranking may be expressed in the difference in display, for example in color of the frame of the program. In this case, for example the frame of a program having higher ranking is expressed more conspicuously than the frame of the program having lower rankings.

Also, the title of the RSS article, the keywords included in the body text displayed on the program/RSS article introduction screen may be displayed in a more conspicuous manner than the other words. For the display of the title of the RSS article and the body text, if the title and the entire body text are not allowed to be displayed at once in an allocated area, the summary may be displayed, or the content may flow from one side of the screen to the other side. The display of the title of the RSS article may flow repeatedly, and the user may be allowed to stop the flow at a predetermined timing. After the display of the title flows once, for example the other information on the program, such as a channel and a broadcast time, etc., acquired from the program information may be displayed subsequently.

Also, the RSS articles whose body text and Web pages are not checked by the user may be displayed differently in color from those that have already checked. The titles of important RSS articles may be displayed conspicuously, or those titles and body texts may be displayed to be popped up.

Also, the user may switch the RSS articles to an upper-level RSS article or a lower-level RSS article in sequence. The user may also be allowed to delete unnecessary RSS articles.

Furthermore, in an area in which the titles and the body texts of the RSS articles are displayed, information other than the RSS articles, for example an advertisement, the URL of a predetermined site (for example, the delivery site of the RSS article), etc., may be displayed. When the recording reservation of a program is set, the RSS article may be acquired, and that RSS article may be selected as the related information to the recorded program.

Also, such program-related information may not be displayed in the vicinity of the program, and may be displayed on a display unit such as a mobile terminal, etc., provided separately from the TV 2. That is to say, when the information related to a program is selected, the information processing apparatus 1 transmits the information, such as the titles and the body texts of the RSS articles to a separate apparatus using wireless or wired communication.

In the above description, the programs to be introduced on the program/RSS article introduction screen are the programs being broadcast or the recorded programs. However, if there is no program to be introduced among the recorded programs and the programs being broadcast, the programs scheduled to be broadcast may be introduced. In this case, the information, such as the image of the program scheduled to be broadcast acquired from the program information, the title of the program, the performers, etc., are displayed in the area allocated for the program scheduled to be broadcast within the program/RSS article introduction screen. Furthermore, when the same information as the EPG in the program scheduled to be broadcast is provided, the stream content acquired through the Internet may be introduced.

Also, in the above description, a plurality of programs are selected on the basis of one set of the program rankings created, and are displayed in individual areas of the program/RSS article introduction screen. However, such program rankings may be created for each category, the programs may be selected for each category on the basis of the program rankings in each category, and may be displayed on the program/RSS article introduction screen. For example, as described with reference to FIG. 11, when the "father" receives the delivery of the RSS articles on "soccer", "all sports", and "horse racing", the RSS article keywords are extracted for each category ("soccer", "all sports", and "horse racing"), and the program rankings are created using the extracted RSS article keywords. The programs that are listed on the first rankings for individual categories are displayed on the program/RSS article introduction screen. Thus, the user can check the program that has become a topic for each category.

Also, the user may be allowed to modify the keywords and the program rankings that are the bases of the program selection by himself/herself. Furthermore, the program selection may be carried out with reference to the user's viewing history on the RSS articles, operation history, etc.

Also, the RSS articles to be the bases of the program selection may be acquired from the delivery sites at the time of the profile selection.

Also, after turning the power on, the RSS articles may be acquired, the program selection processing may be performed, and the selected program may be displayed without displaying the profile selection screen. At that time, the program may be selected on the basis of all the RSS articles that are individually delivered to a plurality of users (for example, all the family members). Alternatively, the program may be selected on the basis of all the RSS articles that are delivered to the user having the first priority among the individual users.

Furthermore, in the above description, different programs are individually displayed on the program/RSS article introduction screen. However, different scenes of the same program may be selected on the basis of the closed captions, and the individual scenes may be displayed. Thus, the user can select a scene to be viewed. Also, the RSS articles may be selected as the related information on the basis of not only the program information of the display candidates but also the closed captions, etc.

The above-described series of processing can be executed by hardware or can be executed by software. When the series of processing is executed by software, the programs constituting the software are built in a dedicated hardware of a computer. Alternatively, the various programs are installed in, for example a general-purpose personal computer capable of executing various functions from a recording medium.

FIG. 31 is a block diagram illustrating an example of the configuration of a personal computer for executing the above-described series of processing. A CPU 201 executes various kinds of processing in accordance with the programs stored in a ROM 202 or a storage section 208. A RAM 203 appropriately stores programs to be executed by the CPU 201, data, etc. The CPU 201, the ROM 202, and the RAM 203 are mutually connected with a bus 204.

An input/output interface 205 is connected to the CPU 201 through the bus 204. An input section 206 including a keyboard, a mouse, a microphone, etc., and an output section 207 including a display, a speaker, etc., are connected to the input/output interface 205. The CPU 201 executes various kinds of processing in accordance with instructions input from the input section 206. The CPU 201 outputs the result of the processing to the output section 207.

The storage section 208 connected to the input/output interface 205 includes, for example a hard disk, and stores the programs executed by the CPU 201 and various kinds of data. A communication section 209 communicates with an external apparatuses through a network such as the Internet, a local area network, etc.

Also, the programs may be acquired through the communication section 209, and may be stored in the storage section 208.

When a removable medium 211, such as a magnetic disk, an optical disc, a magneto-optical disc, or a semiconductor memory, etc., is attached, a drive 210 connected to the input/output interface 205 drives the medium, and acquires the program and the data recorded there. The acquired program and data is transferred to the storage section 208 as required, and is stored there.

The program recording medium for storing the programs, which are installed in a computer and is executable by the computer, includes, as shown in FIG. 31, a removable medium 211 which is a package medium including, such as a magnetic disk (including a flexible disk), an optical disc (including a CD-ROM (Compact Disk-Read Only Memory) and a DVD (Digital Versatile Disk)), a magneto-optical disc, or a semiconductor memory, etc. Alternatively, the program recording medium includes a ROM 202 for storing the programs temporarily or permanently, a hard disk constituting the storage section 208, etc. The storage of the programs into the program recording medium is carried out through the communication section 209, which is a router, a modem, etc., as necessary, or using a wired or wireless communication medium, such as a local area network, the Internet, a digital satellite broadcasting, etc.

In this regard, in this specification, the steps describing the programs to be stored in the program recording medium include the processing to be performed in time series in accordance with the described sequence as a matter of course. Also, the steps include the processing which is not necessarily executed in time series, but is executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a processor;
   a first selection unit configured to extract and rank a keyword from program information of a predetermined program selected from at least one of a program being received and a recorded program, and to select article information having a highest ranking and which includes the same keyword as the extracted keyword among article information described in a Resource Description Framework Site Summary (RSS) format;
   a display controller configured to display the article information having the highest ranking selected by the first selection section simultaneously with an image of the predetermined program;
   a first setting unit configured to extract a keyword from article information described in RSS format, and to rank the extracted keyword;
   a second setting unit configured to acquire at least one of program information on a program being received and program information on a recorded program, and to rank the program which includes, in the program information, the same keyword as a keyword having a predetermined ranking among the keywords having rankings provided by the first setting unit; and
   a second selection unit configured to select the predetermined program on the basis of the rankings given by the second setting unit.

2. The information processing apparatus according to claim 1, wherein the display controller is further configured to switch displays of the article information in accordance with the rankings.

3. The information processing apparatus according to claim 1, wherein the display controller is configured to display at least one of a program/RSS article introduction screen including a main screen, an RSS article title display section, an RSS article body text display section, at least one sub-screen, and an RSS article title display.

4. The information processing apparatus according to claim 3, wherein, a widest area is allocated to the main screen, the main screen is an area in which the program having the highest ranking selected from the recorded program or the program being broadcast is displayed.

5. The information processing apparatus according to claim 4, wherein when information published on an RSS article delivery site is updated, a plurality of RSS articles are acquired immediately after the update, and the programs are selected on the basis of the acquired RSS articles.

6. A method of information processing, comprising:

extracting a keyword from program information of a predetermined program selected from at least one of a program being received and a recorded program;

selecting article information which includes the same keyword as the extracted keyword among the article information described in a Resource Description Framework Site Summary (RSS) format and being delivered to a user, the selecting article information including ranking the extracted keyword and selecting article information having a highest ranking;

displaying the selected article information having the highest ranking simultaneously with an image of the predetermined program;

extracting a keyword from article information described in RSS format, and ranking the extracted keyword;

acquiring at least one of program information on a program being received and program information on a recorded program, and to rank the program which includes, in the program information, the same keyword as a keyword having a predetermined ranking among the keywords having rankings provided by the extracting the keyword from article information step; and selecting the predetermined program on the basis of the rankings given by the acquiring step.

7. A computer readable storage medium encoded with a computer readable program configured to cause an information processing apparatus to execute a method, the method comprising:

extracting a keyword from program information of a predetermined program selected from at least one of a program being received and a recorded program;

selecting article information which includes the same keyword as the extracted keyword among the article information described in a Resource Description Framework Site Summary (RSS) format and being delivered to a user, the selecting article information including ranking the extracted keyword and selecting article information having a highest ranking;

displaying the selected article information having the highest ranking simultaneously with an image of the predetermined program;

extracting a keyword from article information described in RSS format, and ranking the extracted keyword;

acquiring at least one of program information on a program being received and program information on a recorded program, and to rank the program which includes, in the program information, the same keyword as a keyword having a predetermined ranking among the keywords having rankings provided by the extracting the keyword from article information step; and selecting the predetermined program on the basis of the rankings given by the acquiring step.

8. The computer readable storage medium according to claim 7, wherein the displaying the article information includes switching displays of the article information in accordance with the rankings.

* * * * *